US012597362B1

(12) United States Patent
Aloisio et al.

(10) Patent No.: US 12,597,362 B1
(45) Date of Patent: *Apr. 7, 2026

(54) NETWORKED VIRTUAL REALITY TRAINING SYSTEMS AND METHODS

(71) Applicant: Architecture Technology Corporation, Eden Prairie, MN (US)

(72) Inventors: Scott Aloisio, Eden Prairie, MN (US); Joseph Sirianni, Eden Prairie, MN (US); Kenneth Mcvearry, Eden Prairie, MN (US); Robert A. Joyce, Eden Prairie, MN (US)

(73) Assignee: Architecture Technology Corporation, Eden Prairie, MN (US)

( * ) Notice: Subject to any disclaimer, the term of this patent is extended or adjusted under 35 U.S.C. 154(b) by 40 days.

This patent is subject to a terminal disclaimer.

(21) Appl. No.: 17/971,388

(22) Filed: Oct. 21, 2022

Related U.S. Application Data

(63) Continuation of application No. 16/789,262, filed on Feb. 12, 2020, now Pat. No. 11,508,253.

(51) Int. Cl.
G09B 9/00 (2006.01)
G06F 3/01 (2006.01)
(Continued)

(52) U.S. Cl.
CPC ................ G09B 9/00 (2013.01); G06F 3/011 (2013.01); G06F 3/013 (2013.01); G06F 3/014 (2013.01);
(Continued)

(58) Field of Classification Search
None
See application file for complete search history.

(56) References Cited

U.S. PATENT DOCUMENTS 6,292,792 B1   9/2001   Baffes et al.
7,574,018 B2   8/2009   Luo
(Continued)

FOREIGN PATENT DOCUMENTS

KR        10-2042989 B1    11/2017
WO       WO-00/04478 A2    1/2000

OTHER PUBLICATIONS

"Military Simulation and Virtual Training Market Worth US$ 15.12 Billion by 2026 CAGR 4.0%" Acumen Research and Consulting, press release, Jan. 10, 2019, 3 pages.
(Continued)

*Primary Examiner* — Jordany Nunez
(74) *Attorney, Agent, or Firm* — Foley & Lardner LLP

(57) ABSTRACT

Disclosed herein are embodiments for managing a virtual reality (VR) training exercise via a management server. The management server outputs a graphical dashboard including one or more skill nodes, and selects one or more software agents associated with the skill nodes. The management server provides the software agents to at least one host computing system communicatively coupled to a near-to-eye display device. The near-to-eye display device is configured to display a virtual three dimensional (3D) training environment including a plurality of interactive 3D virtual objects. The software agents are configured to collect VR observables data while the trainee performs actions within the virtual 3D training environment. Based on the VR observables data collected, the management server determines that one or more skills have been demonstrated during the training exercise, and updates the one or more skill nodes to graphically indicate the one or more skills demonstrated by the trainee.

20 Claims, 10 Drawing Sheets

600

(51) Int. Cl.

| | |
|---|---|
| G06F 3/04815 | (2022.01) |
| G06F 3/0484 | (2022.01) |
| G09B 5/00 | (2006.01) |
| G09B 19/00 | (2006.01) |

(52) U.S. Cl.

CPC ........ G06F 3/04815 (2013.01); G06F 3/0484 (2013.01); G09B 5/00 (2013.01); G09B 19/003 (2013.01)

(56) References Cited

U.S. PATENT DOCUMENTS

| | | | |
|---|---|---|---|
| 7,920,071 | B2 | 4/2011 | Baillot |
| 8,406,682 | B2 | 3/2013 | Elesseily et al. |
| 9,076,342 | B2 | 7/2015 | Brueckner et al. |
| 9,911,352 | B2 | 3/2018 | Williams et al. |
| 10,068,493 | B2 | 9/2018 | Brueckner et al. |
| 10,083,624 | B2 | 9/2018 | Brueckner et al. |
| 10,307,583 | B2 | 6/2019 | Williams et al. |
| 10,307,853 | B2 * | 6/2019 | Becker ............ G06Q 10/06398 |
| 10,346,612 | B1 | 7/2019 | Donovan et al. |
| 10,529,140 | B1 | 1/2020 | Ravindran et al. |
| 11,747,890 | B2 * | 9/2023 | Papon ................ G02B 27/0179 |
| | | | 345/156 |
| 11,887,505 | B1 * | 1/2024 | Aloisio ................. G06T 19/006 |
| 2005/0216243 | A1 | 9/2005 | Graham et al. |
| 2009/0046893 | A1 | 2/2009 | French et al. |
| 2012/0129141 | A1 | 5/2012 | Granpeesheh |
| 2012/0214147 | A1 | 8/2012 | Ernst et al. |
| 2014/0162224 | A1 | 6/2014 | Wallace et al. |
| 2015/0050623 | A1 | 2/2015 | Falash et al. |
| 2015/0056584 | A1 * | 2/2015 | Boulware ............ B23K 9/0956 |
| | | | 434/234 |
| 2015/0099252 | A1 | 4/2015 | Anderson et al. |
| 2015/0154875 | A1 | 6/2015 | Digiantomasso et al. |
| 2016/0019217 | A1 | 1/2016 | Reblitz-Richardson et al. |
| 2016/0063883 | A1 | 3/2016 | Jeyanandarajan |
| 2016/0077547 | A1 | 3/2016 | Aimone et al. |
| 2016/0321583 | A1 | 11/2016 | Jones et al. |
| 2017/0032694 | A1 | 2/2017 | Brueckner et al. |
| 2017/0136296 | A1 | 5/2017 | Barrera et al. |
| 2017/0162072 | A1 | 6/2017 | Horseman et al. |
| 2017/0221267 | A1 | 8/2017 | Tommy et al. |
| 2018/0165983 | A1 | 6/2018 | Ragozzino et al. |
| 2018/0203238 | A1 | 7/2018 | Smith, Jr. |
| 2018/0293802 | A1 | 10/2018 | Hendricks et al. |
| 2019/0025906 | A1 | 1/2019 | Strong et al. |
| 2019/0034489 | A1 | 1/2019 | Ziegler |
| 2019/0282324 | A1 | 9/2019 | Freeman et al. |
| 2019/0304188 | A1 | 10/2019 | Bridgeman et al. |
| 2019/0373297 | A1 | 12/2019 | Sarkhel et al. |
| 2020/0012671 | A1 | 1/2020 | Walters et al. |
| 2020/0033144 | A1 | 1/2020 | Du et al. |
| 2020/0135042 | A1 | 4/2020 | An et al. |
| 2021/0027647 | A1 | 1/2021 | Baphna et al. |
| 2021/0043106 | A1 | 2/2021 | Kotra et al. |
| 2021/0192413 | A1 * | 6/2021 | Shirazipour ..... G06Q 10/06311 |
| 2021/0335148 | A1 | 10/2021 | Fujiwara et al. |

OTHER PUBLICATIONS

Architecture Technology Corporation, "Cyrin—Virtual Advanced Cyber Training Now With Three Levels of Training Designed for the Utility Industry", Press Release, Corporate Headquarters, https://www.pressrelease.com/files/fb/Of/548a5a42ceeed67a8ace4e5123d2. pdf; Jun. 6, 2019; 10 pages.
Architecture Technology Corporation, Proposal No. N192-094, N192-094-0032, Jun. 19, 2019.
Brueckner et. al.,(Air Force Research Laboratory); "Automated Computer Forensics Training in a Virtualized Environment", Digital Forensic Research Conference, DFRWS 2008 USA, Aug. 11-13, 2008; 8 pages.

Chief of Staff, United States Air Force; "Enhancing Multi-domain Command and Control ... Tying It All Together," https://www.af.mil/Portals/1/documents/csaf/letter3/Enhancing_Multi-domain_CommandControl.pdf, Sep. 18, 2018; 3 pages.
Fade, "How Virtual Reality is Transforming Military Training", https://vrvisiongroup.com/how-virtual-reality-is-transforming-military-training/, May 30, 2018, 12 pages.
Final Office Action for U.S. Appl. No. 16/267,252 dated Sep. 28, 2021 (11 pages).
Final Office Action for U.S. Appl. No. 16/892,911 dated Mar. 15, 2022 (17 pages).
Hollister, "SCENTS, Scenario-based Training Service", Phase I SBIR Proposal, Topic Number and Name: A18-092 Scenario-based Training Content Discovery, and Adaptive Recommendation, Architecture Technology Corporation, Feb. 7, 2018, 23 pages.
Kim, "Operational planning for theater anti-submarine warfare", Calhoun Institutional Archive of the Naval Postgraduate School, http://hdl.handle.net/10945/53000, Mar. 2017, 52 pages.
Lentz et al., "NPSNET: Naval Training Integration," Proceedings of the 13th DIS Workshop, Orlando, Florida, ba6cee448ad439f38d8e69ee3bd427fec63b.pdf, Sep. 18-22, 1995, pp. 107-112.
Levski, "10 Virtual Reality Business Opportunities Poised to Explode," https://appreal~vr.com/blog/10-virtual-reality-business-opportunities/, Copyright© 2020 AppReal-VR, 16 pages.
Levski, "15 Greatest Examples of Virtual Reality Therapy", https://agpreal~vr.com/blog/virtualreality-therapy-potential/, Press Release, Copyright© 2020 AppReal-VR, 15 pages.
Morgan, "Anti-Submarine Warfare A Phoenix for the Future," Undersea Warfare Magazine, 1998, https://www.public.navy.mil/subfor/underseawarfaremagazine/Issues/Archives/issue_01/anti.htmAccess ed Jun. 19, 2019, 7 pages.
Non-Final Office Action for U.S. Appl. No. 16/789,262 dated Mar. 23, 2022 (19 pages).
Non-Final Office Action for U.S. Appl. No. 16/892,911 dated Oct. 28, 2021 (16 pages).
Non-Final Office Action on U.S. Appl. No. 16/267,252 dated Aug. 21, 2020. 8 pages.
Non-Final Office Action on U.S. Appl. No. 16/267,252 dated Mar. 22, 2021.
Non-Final Office Action on U.S. Appl. No. 16/267,252 dated May 25, 2022 (12 pages).
Notice of Allowance on U.S. Appl. No. 16/789,262 dated Jul. 14, 2022 (8 pages).
Notice of Allowance on U.S. Appl. No. 16/892,911 dated Jun. 13, 2022 (7 pages).
Picoco et al., "Dynamic Event Tree Generation With Raven—MAAP5 Using Finite State Machine System Models," Sep. 25, 2017, pp. 100-106.
Press Release, Corporate Headquarters, Architecture Technology Corporation; "CYRIN—Virtual Advanced Cyber Training Now With Three Levels of Training Designed for the Utility Industry", https://www.pressrelease.com/files/fb/0f/548a5a42ceeed67a8ace4e5123d2.pdf; Jun. 6, 2019; 10 pages.
Putnam, "Multiplayer Serious Game for Anti-Submarine Warfare Sonar Operator Training," Navy SBIR 2019.2—Topic N192-094, https://www.ncbi.nlm.nih.gov/pmcAccessed Jun. 19, 2019, 3 pages.
Reynolds, "Multi-domain command and control is coming," Headquarters Air Force Strategic Integration Group, https://www.af.mil/News/Article-Display/Article/1644543/multi-domain-command-and-control-is-coming/, Sep. 25, 2018; 3 pages.
SimCYRIN Phase II proposal (vol. 2) Final, completed Oct. 25, 2015.
Simcyrin, "Simulation Deployment and Management System", ATC-NY, Topic: AF183-006, Proposal#: F183-006-0193, 15 pages.
Singh, "Virtual Reality Market worth $53.6 billion by 2025", press release, https://www.marketsandmarkets.com/PressReleases/ar-market.asp, 7 pages.
T&D World, "ATCorp Announces Virtual, Online Cyber Security Training for the Utility Industry", https://www.tdworld.com/safety-and-training/article/20972718/atcorp-announces-virtual-online-cyber-security-training-for-the-utility-industry, Jun. 19, 2019, (4 pages).

(56) References Cited

OTHER PUBLICATIONS

Wong et. al., "Next-Generation Wargaming for the U.S. Marine Corps", Rand Corporation, Nov. 30, 2019; (253 pages).

Yardley et. al., "Use of Simulation for Training in the U.S. Navy Surface Force," Rand Corp, National Defense Research Institute, https://www.rand.orq/content/dam/rand/pubs/monographreports/2005/MR1770.pdf, 2003, 123 pages.

Title: Distributed Dynamic Event Tree Generation for Reliability and Risk Assessment, Author: Rutt et al., Date: Jun. 2006, Publisher: IEEE, pp. 61-70.

\* cited by examiner

500

| INSTRUCTORS | PLUGINS | | | |
|---|---|---|---|---|
| AGENT PLUGINS | | | | |

 ⬚ | ○ADD NEW    DELETE

| ID | DATE ADDED | NAME | DESCRIPTION | UPLOADER |
|---|---|---|---|---|
| 1 | 02/13/2015 | FILE SYSTEM MONITOR | REPORTS CHANGES TO FILES... | ADMIN |
| 2 | 02/13/2015 | LOGIN_TEST | ATTEMPTS TO LOG A USER IN | ADMIN |
| 3 | 02/13/2015 | EMAIL_SENDER | SENDS AN EMAIL VIA THE... | ADMIN |
| 4 | 02/13/2015 | NETWORK CONNECTION LIST | LISTS CURRENT NETWORK CO... | ADMIN |
| 5 | 02/13/2015 | NETWORK CONNECTION MO... | REPORTS START/STOP OF NE... | ADMIN |
| 6 | 02/13/2015 | PROCESS LIST | LISTS CURRENT RUNNING PR... | ADMIN |
| 7 | 02/13/2015 | PROCESS MONITOR | REPORTS START/STOP OF PR... | ADMIN |
| 8 | 02/13/2015 | PROGRAM LIST | CREATES A LIST OF ALL PROG... | ADMIN |
| 9 | 02/13/2015 | REGISTRY MONITOR | REPORTS CHANGES TO SPEC... | ADMIN |
| 10 | 02/13/2015 | REMOTE PORT MONITOR | CHECK FOR CONNECTION TO... | ADMIN |
| 11 | 02/13/2015 | SESSION MONITOR | REPORTS CHANGES TO USER... | ADMIN |
| 12 | 02/13/2015 | WEBPAGE SEARCH | REPORTS IF A WORD IS LOCA... | ADMIN |
| | | | | |
| | | | | |
| | | | | |
| | | | | |
| | | | | |
| | | | | |
| | | | | |

| SERVER RESPONSE 0.126 SEC | 1-12 OF 12 (BUFFERED 12) |
|---|---|

AGENT:

| FILE SYSTEM MONITOR | ⌄ | — 710

POINTS: | | — 720

AGENT OPTIONS:

DIRECTORY: | | (?)

FILE NAME FILTER: | | (?) — 730

EVALUATION CRITERIA:

| PATH | CONTAINS ⌄ | | (?) |
| STATUS | CONTAINS ⌄ | | (?) |
| RENAMED_TO | CONTAINS ⌄ | | (?) | — 740
| CHANGE_TYPE | CONTAINS ⌄ | | (?) |

APPLY TO NODE: | WEBSERVER ⌄ | — 750

| SAVE | | CANCEL |

FIG. 7

FIG. 8

⌂HOME   SYSTEM ADMINISTRATION

EXERCISE INFORMATION
NAME: DEMONSTRATION
START DATE: 12-12-2014 12:07:09
STOP DATE: 12-12-2014 12:11:46

RESULTS SUMMARY
OBJECTIVES: 50% (2 OUT OF 4)
SKILLS: 83% (5 OUT OF 6)
AGENTS: 70% (7 OUT OF 10)

OBJECTIVES VIEW

| OBJECTIVES, SKILL, AND AGENTS | MET / NOT MET |
|---|---|
| LOGIN_TEST | FALSE |
| SECURE MAIL SERVER | TRUE |
| MANAGE DOMAIN USERS | TRUE |
| WEBPAGE SEARCH | TRUE |
| START APACHE | TRUE |
| OPEN FIREWALL PORT | TRUE |
| LOGIN TEST | TRUE |
| FILE SYSTEM MONITOR | FALSE |
| WEB SERVER ADMINISTRATION | TRUE |
| OPEN FIREWALL PORT | TRUE |
| ADD USERS | TRUE |
| REMOTE PORT MONITOR | TRUE |
| LOGIN_TEST | FALSE |
| DISABLE OPEN RELAY | TRUE |
| REMOTE PORT MONITOR | TRUE |
| FILE SYSTEM MONITOR | TRUE |
| SETUP WEB DIRECTORY | FALSE |
| NETWORK MANAGEMENT FUNDAMENTALS | TRUE |
| PROCESS MONITOR | TRUE |
| EMAIL_SENDER | TRUE |

STUDENT ACTIVITY

| TIMESTAMP | EVENT DATA |
|---|---|
| 12-12-2014 12:38:32 | HOST = WORKSTATION1<br>PLUGIN = LOGIN_TEST<br>LOGIN = SUCCESS |
| 12-12-2014 12:39:05 | HOST = WEBSERVER<br>CHANGE TYPE = CREATED<br>PATH = /VAR/WWW/HTML/INDEX.HTML<br>PLUGIN = FSWATCH<br>STATUS = CHANGED<br><br>HOST = WEBSERVER |

800

900

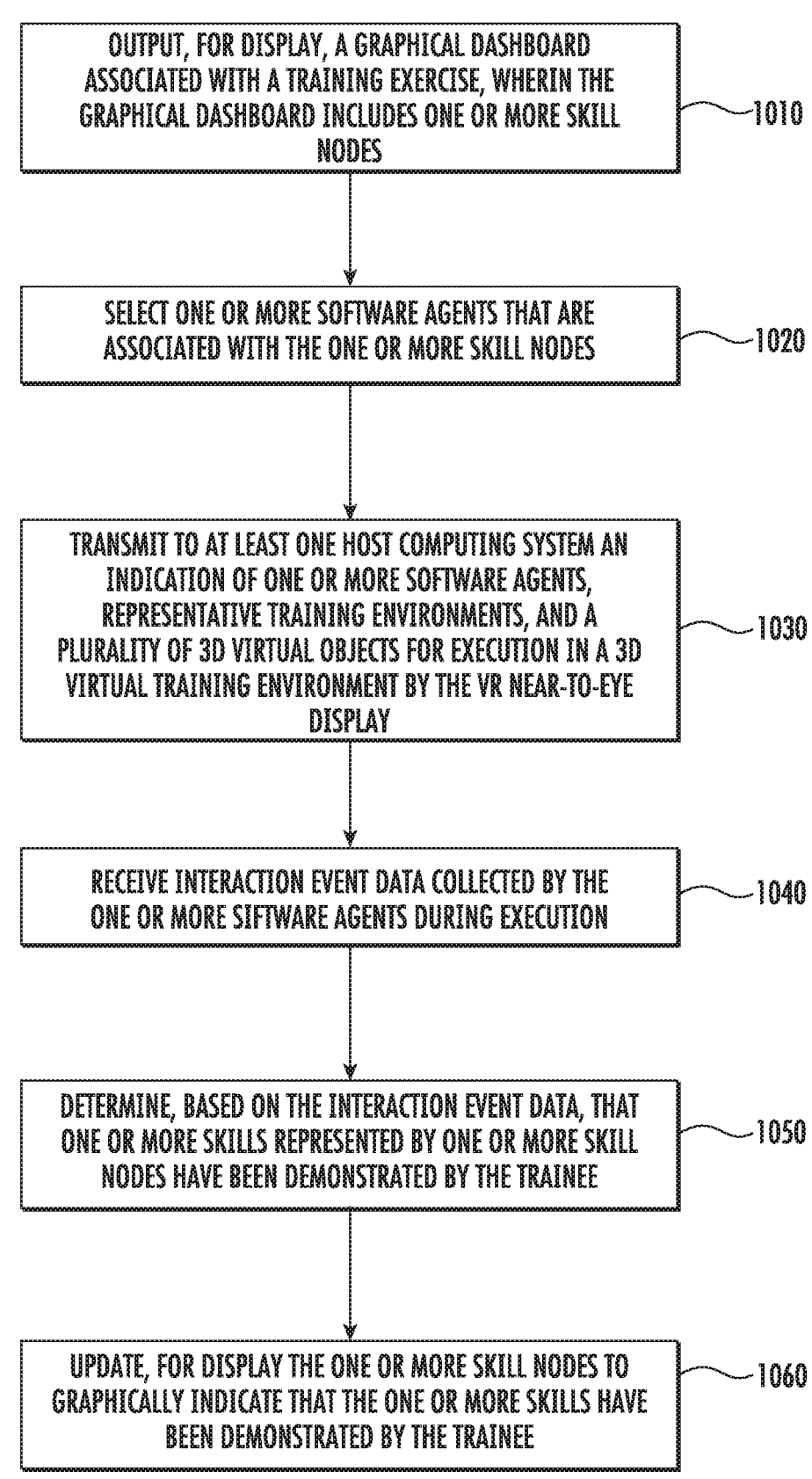

OUTPUT, FOR DISPLAY, A GRAPHICAL DASHBOARD ASSOCIATED WITH A TRAINING EXERCISE, WHERIN THE GRAPHICAL DASHBOARD INCLUDES ONE OR MORE SKILL NODES ⟩~1010

SELECT ONE OR MORE SOFTWARE AGENTS THAT ARE ASSOCIATED WITH THE ONE OR MORE SKILL NODES ⟩~1020

TRANSMIT TO AT LEAST ONE HOST COMPUTING SYSTEM AN INDICATION OF ONE OR MORE SOFTWARE AGENTS, REPRESENTATIVE TRAINING ENVIRONMENTS, AND A PLURALITY OF 3D VIRTUAL OBJECTS FOR EXECUTION IN A 3D VIRTUAL TRAINING ENVIRONMENT BY THE VR NEAR-TO-EYE DISPLAY ⟩~1030

RECEIVE INTERACTION EVENT DATA COLLECTED BY THE ONE OR MORE SIFTWARE AGENTS DURING EXECUTION ⟩~1040

DETERMINE, BASED ON THE INTERACTION EVENT DATA, THAT ONE OR MORE SKILLS REPRESENTED BY ONE OR MORE SKILL NODES HAVE BEEN DEMONSTRATED BY THE TRAINEE ⟩~1050

UPDATE, FOR DISPLAY THE ONE OR MORE SKILL NODES TO GRAPHICALLY INDICATE THAT THE ONE OR MORE SKILLS HAVE BEEN DEMONSTRATED BY THE TRAINEE ⟩~1060

FIG. 10

NETWORKED VIRTUAL REALITY TRAINING SYSTEMS AND METHODS

CROSS-REFERENCE TO RELATED APPLICATIONS

This application is a continuation of U.S. patent application Ser. No. 16/789,262, filed Feb. 12, 2020, entitled "SYSTEMS AND METHODS FOR NETWORKED VIRTUAL REALITY TRAINING," which is incorporated by reference in its entirety.

TECHNICAL FIELD

This application relates generally to computing systems that implement training exercises, and more particularly to computing systems that implement training exercises within three-dimensional virtual reality environments.

BACKGROUND

One of the more effective methods of skill acquisition is problem-based learning. In the case of computer-based training, problem-based learning may be achieved by providing realistic, hands-on exercises to trainees. Military, commercial enterprises, and academic institutions all conduct computer-based training to educate and train personnel. Exercises are conducted in both individual and group formats, and team exercises may be conducted cooperatively or as competitions.

Near-to-eye displays can be used to display only computer generated images (such as virtual reality (VR) platforms) and can display computer generated images in combination with a real world physical environment (such as augmented reality (AR) platforms). There are VR training applications on the market. However, typically only a single user is accommodated for the training process. The conventional VR training experience usually consists of static step-by-step routines that the user must follow while engaged in a VR world. The user is typically required to go through a preset training routine following a preprogrammed order of actions. Some existing multi-user VR training applications may support more than one user. However, typically each user's view is limited to his own perspective. Additionally, because the user is following the training experience based on the predetermined step-by-step routines, it is difficult to assess the skills of the user in that virtual environment.

SUMMARY

What is therefore desired is virtual reality based training that provides more user flexibility including training aids to address the problems noted above. What is needed is training aids that provide more user flexibility in the design of training scenarios and in user interactions with a virtual training environment. What is needed is VR training systems that may support more than one user, and that do not limit each user's view to his own perspective.

Embodiments disclosed herein solve the aforementioned technological problems and/or other technological problems. The systems and methods of the disclosure provide trainees with web-based virtual reality scenes that enable trainees to interact with complex underlying simulation environments. Advanced virtual training simulations enable trainees to explore and understand winning strategies in a command and control context. Self-monitored training tools provide accurate user status and progress monitoring and do not require instructors to monitor the trainee in real time.

Disclosed embodiments include an exemplary method for managing a training exercise via a management server. At a first step the management server outputs, for display, a graphical dashboard associated with a training exercise, wherein the graphical dashboard includes one or more skill nodes that represent one or more skills to be demonstrated by the trainee during the training exercise. Further steps include selecting one or more software agents that are associated with the one or more skill nodes, and providing, by the management server to at least one host computing systems, an indication of the one or more software agents that are executed during the training exercise. Each of the at least one host computing systems is communicatively coupled to a near-to-eye display device configured to display a virtual three dimensional (3D) training environment including a plurality of interactive 3D virtual objects. The one or more software agents are configured to collect VR observables data each representative of a trainee interaction with one or more of the interactive 3D virtual objects from the at least one host computing systems while the trainee performs actions within the virtual 3D training environment displayed by the near-to-eye display device.

The exemplary method further includes determining, by the management server based on the VR observables data collected, that the one or more skills represented by the one or more skill nodes have been demonstrated by the trainee during the training exercise. Responsive to determining that the one or more skills have been demonstrated, the management server updates, for display, the one or more skill nodes to graphically indicate that the one or more skills have been demonstrated by the trainee during the training exercise.

In various embodiments, the VR observables data includes one or both of a state of the virtual 3D training environment at a point in time, and a change to state of the virtual 3D training environment at a point in time or during a period of time. In various embodiments, the VR observables data includes interaction event data representative of a trainee interaction with one or more of the interactive 3D virtual objects within the virtual 3D training environment.

In various embodiments, the graphical dashboard further includes one or more learning objective nodes that represent one or more learning objectives to be accomplished by the trainee during the training exercise. One or more skills support the learning objectives, and the graphical dashboard graphically indicates the learning objectives.

In an embodiment, the one or more skill nodes graphically indicate that the skills have not yet been demonstrated by the trainee. The method updates the graphical dashboard by updating the one or more skill nodes to graphically indicate that the one or more skills have been demonstrated by the trainee during the training exercise.

In various embodiments, the method further includes determining one or more metrics used in determining whether the one or more skills have been demonstrated. The method identifies VR observables data that can be collected by the at least one host computing systems to calculate the one or more metrics, and provides one or more metric parameters to configure one or more software agents to collect the VR observables data.

In various embodiments, the management server is configured to automatically monitor a state of each of the one or more interactive 3D virtual objects. The state includes one or more metrics for determining whether the one or more skills have been demonstrated. In an embodiment, the management server is further configured to monitor one or more trainee input actions performed within the virtual 3D training environment correlated with the state of each of the one or more interactive 3D virtual objects.

In an embodiment, the near-to-eye display device is a head mounted virtual reality VR display, and the virtual 3D training environment is an immersive virtual environment.

In various embodiments, the VR observables data track one or more trainee input actions performed within the virtual 3D training environment in six degrees of freedom. The tracking in six degrees of freedom determines one or more positions and orientations within the virtual 3D training environment associated with each trainee input action. In an embodiment, the VR observables data match the one or more trainee input actions to a trajectory prediction model that outputs, for each trainee input action, a heading, an angle, a course, and a derived velocity. In various embodiments, the VR observables data track one or more trainee input actions performed within the virtual 3D training environment effecting one or more visibility attributes of one or more of the interactive 3D virtual objects. In various, the visibility attributes comprise one or more of magnification, orientation, openness, brightness, contrast, resolution, and level of detail.

In various embodiments, the training exercise comprises a team exercise for a first team and a second team. In an embodiment, the trainee is a member of the first team, and the one or more skill nodes represent the one or more skills to be demonstrated by the first team during the training exercise. In an embodiment, the trainee is assigned a particular role on the first team and the trainee is assigned to a task of demonstrating the one or more skills during the training exercise based on the particular role.

An exemplary system includes a processor, non-transitory machine-readable memory, a host computing system communicatively coupled to the management server, and a near-to-eye display device communicatively coupled to the host computing system. The non-transitory machine-readable memory stores one or more skill nodes, one or more representative training environments, and a plurality of interactive 3D virtual objects. The processor in communication with the non-transitory machine-readable memory and the host computing system executes a set of instructions for managing a training exercise. The system is configured to output, for display, a graphical dashboard including one or more skill nodes that represent one or more skills to be demonstrated by the trainee during a training exercise, and to select one or more software agents that are associated with the one or more skill nodes. The software agents are configured to collect VR observables data from the one host computing system. The VR observables data are representative of trainee interactions with one or more interactive 3D virtual objects while the trainee performs actions within a virtual 3D training environment displayed by the near-to-eye display device.

In the exemplary system, the processor is configured to transmit various data to the host computing system for execution during the training exercise. Transmitted data include an indication of the selected software agents to be executed, at least one of the one or more representative training environments and at least some of the plurality of interactive 3D virtual objects for inclusion in the virtual 3D training environment. The processor is further configured to receive from the host computing system the VR observables data collected by the one or more software agents, and responsive to the collected VR observables data, to update the graphical dashboard to graphically indicate at least one of the one or more skills demonstrated by the trainee during the training exercise.

In various embodiments, the system further includes one or more tracked input device communicatively coupled with the host computing system. Each tracked input device is configured to transmit trainee inputs to the host computing system to generate the trainee actions within the virtual 3D training environment. In various embodiments, tracked input devices include one or more of a hand-held keypad, a device for tracking movements of the trainee's arms and hands, a cyberglove, a device for tracking movements of the trainee's retina or pupil, a touch gesture sensor, a tactile input device with reaction force generator, and a camera. In various embodiments, one or more tracked input devices includes a virtual input device. The host computing system is configured to generate an image of the virtual input device for display by the near-to-eye display device and to track trainee gestures relative to the virtual input device to generate the trainee actions within the virtual 3D training environment.

In an embodiment, a method comprising outputting, by a management server and for display, a graphical dashboard associated with a training exercise, wherein the graphical dashboard includes, wherein the graphical dashboard further includes one or more skill nodes that represent one or more skills to be demonstrated by the trainee during the training exercise; selecting, by the management server, one or more software agents that are associated with the one or more skill nodes; providing, by the management server and to at least one host computing system an indication of the one or more software agents that are executed during the training exercise, wherein each of the at least one host computing systems is communicatively coupled to a near-to-eye display device configured to display a virtual three dimensional (3D) training environment including a plurality of interactive 3D virtual objects, wherein the one or more software agents are configured to collect VR observables data from the at least one host computing systems while the trainee performs actions within the virtual 3D training environment displayed by the near-to-eye display device; receiving, by the management server, the VR observables data collected by the one or more software agents during execution; determining, by the management server and based on the VR observables data, whether the one or more skills represented by the one or more skill nodes have been demonstrated by the trainee during the training exercise; and responsive to determining that the one or more skills have been demonstrated, updating, by the management server and for display, the graphical dashboard to indicate that the one or more skills have been demonstrated by the trainee during the training exercise.

In an embodiment, a system comprises a processor; non-transitory machine-readable memory that stores one or more skill nodes, one or more representative training environments, and a plurality of interactive 3D virtual objects; a host computing system communicatively coupled to the management server; and a near-to-eye display device communicatively coupled to the host computing system, wherein the processor in communication with the non-transitory machine-readable memory and the host computing system executes a set of instructions instructing the processor to: output, for display, a graphical dashboard associated with a training exercise including one or more skill nodes that represent one or more skills to be demonstrated by the trainee during the training exercise; select one or more software agents that are associated with the one or more skill nodes, wherein the one or more software agents are configured to collect from the one host computing system VR observables data while the trainee performs actions within a virtual 3D training environment displayed by the near-to-eye display device; transmit to the host computing system for execution during the training exercise, an indication of the selected software agents to be executed, and at least one of the one or more representative training environments and at least some of the plurality of interactive 3D virtual objects for inclusion in the virtual 3D training environment displayed by the near-to-eye display device; receive from the host computing system the host computing system the VR observables data collected by the one or more software agents during execution; and responsive to the VR observables data collected by the one or more software agents, update, for display, the graphical dashboard to graphically indicate at least one of the one or more skills demonstrated by the trainee during the training exercise.

BRIEF DESCRIPTION OF THE DRAWINGS

The accompanying drawings constitute a part of this specification and illustrate embodiments of the subject matter disclosed herein.

FIG. 5 is a screen diagram illustrating a list of agents and metric plugins for agents, according to an embodiment.

FIG. 7 is a screen diagram illustrating an example agent configuration form, according to an embodiment.

FIG. 8 is a screen diagram illustrating example exercise results provided by an evaluation dashboard, according to an embodiment.

FIG. 10 is a flow diagram illustrating a process performed by a training management server, according to an embodiment.

DETAILED DESCRIPTION

Figure 1:
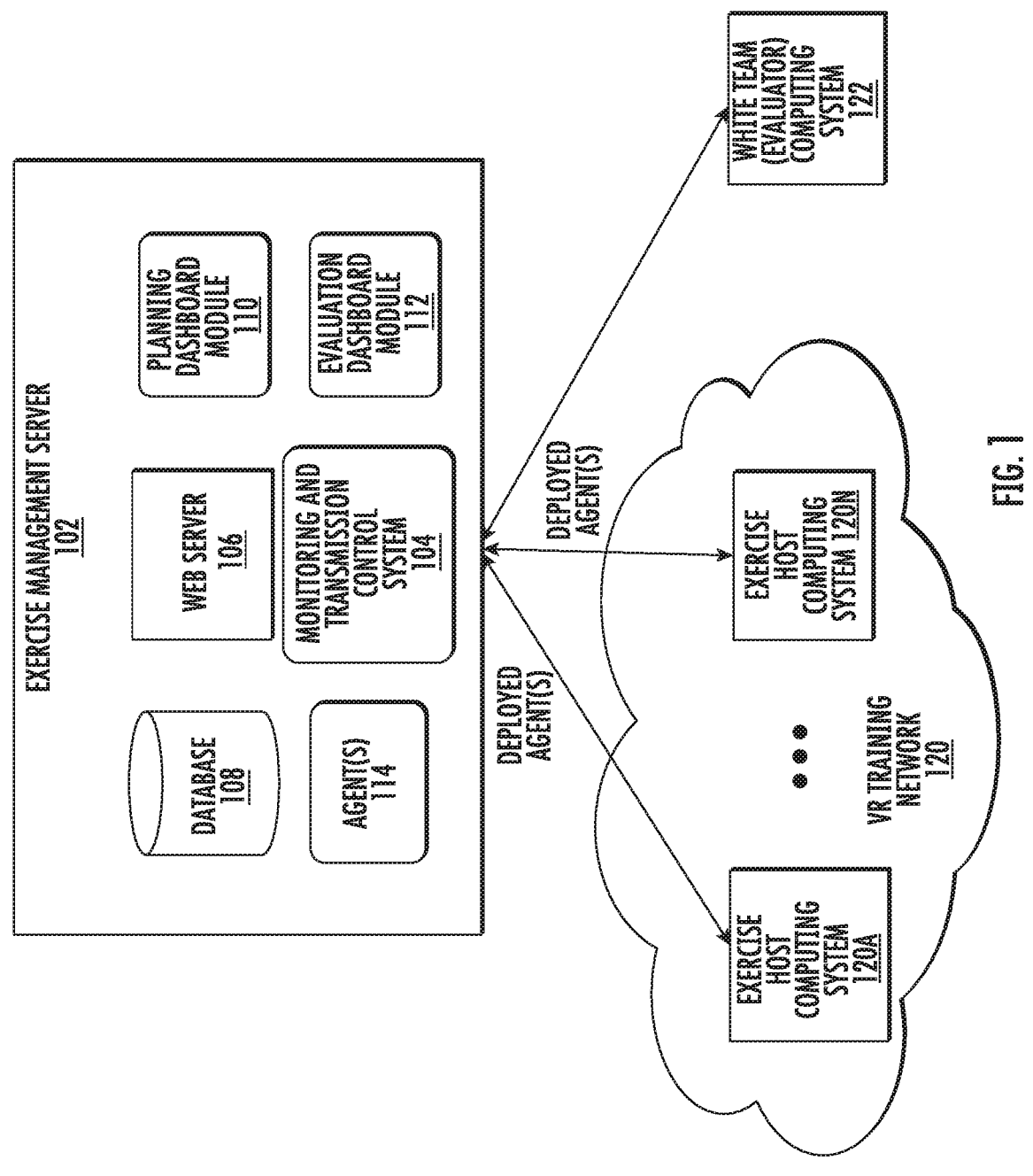
FIG. 1 is a block diagram illustrating an example training environment that includes one or more exercise host computing systems and an exercise management server, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein.

Computer-based training may one of the more effective teaching methods available today, as evidenced, for example, by the military's dedication to training exercises in preparation for battle (e.g., flight simulators). Computer-based training exercises may cover a wide array of training topics, and trainees may have the flexibility of performing training exercises using either local or remote computer connections. Trainees may even obtain online training via the Internet. The personnel who set up, monitor, and assess training exercises are often referred to as the "white team." Effective technologies to help the white team objectively measure and assess trainee performance and provide feedback to trainees are currently lacking. As a result, the full educational potential of computer-based training is not often realized.

Significant effort may, in some cases, be required to devise mission scenarios for computer-based training networks. Usually, in the past, only a small part of this effort is dedicated to automated, objective monitoring and assessment of training exercises. Monitoring, assessment, and debriefing conducted by members of the white team have often been, therefore, very labor-intensive and often inaccurate or incomplete. Existing technologies to support the white team tend to be custom built, have only basic capabilities, and do not facilitate briefings or after-action reports (AAR's).

Additionally, significant effort may be required needed to devise mission scenarios for computer-based training that employs VR technology to visualize training scenarios and environments. The methods and systems of the present disclosure combine the advantages of automated, objective monitoring and assessment of training exercises, with the enhancement of training simulations via networked 3D training environments based upon VR technology. In the present disclosure, the terms computer-based VR training, network-based VR training, and simply VR training, are variously used to denote computer-based training systems employing networked VR technology.

According to one or more aspects, these systems use agents that are deployed on an exercise network to collect exercise data and provide interactive dashboards that assist white team members with planning and monitoring VR training exercises, and also with evaluating trainee performance. These flexible agents support a wide variety of VR training, platforms and missions, thereby potentially eliminating the need for expensive or inadequate custom-built solutions. A fine-grained situational awareness provided by these systems during VR training exercises can, in some cases, be used to improve classroom training and thereby improve the overall effectiveness of the training experience. Dashboard interfaces may also be provided to assist in planning and monitoring an exercise and analyzing its results.

FIG. 1 is a block diagram illustrating an example environment that includes one or more exercise host computing systems 120A-120N (collectively, "exercise host computing systems 120") and an exercise management server 102, according to one or more aspects of the present disclosure. In various examples, exercise management server 102 may comprise a system including one or more processors. Exercise host computing systems 120 may comprise a heterogeneous training exercise network of computing systems employing VR technology, or VR training network, which are communicatively coupled to exercise management server 102 via one or more networks, such as one or more wired and/or wireless networks. Exercise host computing systems 120 may comprise one or more servers, domain controllers, workstations, or other computing devices that are used by individual trainees. As shown in FIG. 1, exercise management server 102 includes a monitoring and transmission control system 104, a web server 106, a database 108, a planning dashboard module 110, an evaluation dashboard module 112, and one or more agents 114. The dashboard modules are capable of outputting, for display, one or more dashboards, such as a planning dashboard and an evaluation dashboard, as will be described in more detail below. If the VR training network includes one or more firewalls, one or more firewall rules may be set up to redirect traffic from a given firewall to appropriate ones of exercise host computing systems 120.

Although the example embodiment describes the use of virtual reality (VR), it is intended that the methods and systems described herein can be configured for the use of augmented reality (AR). Although a real world view is presented in addition to computer generated images in AR, the functionality of the disclosed embodiments is similar.

One or more white team members may use a white team (evaluator) computing system 122, which is communicatively coupled to exercise management server 102, e.g., via one or more wired and/or wireless networks. Prior to an exercise, white team members may use the planning dashboard output by planning dashboard module 110 to capture an existing VR training network or to design a new VR training network, and may create a monitoring and scoring plan for the exercise. The use of the planning dashboard results in a set of dynamic, web accessible briefing documents to orient both white team members and trainees on the exercise and expectations. Planning dashboard module 110 also configures a set of one or more modular agents 114 and objective metrics for use during the exercise. Communication between the agents and exercise management server 102 may be encrypted, such as via the Secure Sockets Layer (SSL) protocol.

While a training exercise is conducted, monitoring and transmission control system 104 deploys agents 114 onto one or more of exercise host computing systems 120 of the VR training network and receives exercise data back from exercise host computing systems 120. Agents 114 monitor trainee performance while the dashboards assist the white team develop briefings, monitor exercises, and deliver debriefs. White team members use the evaluation dashboard output by evaluation dashboard module 112 to visualize the exercise data provided by agents 114 during the training session, such as team or individual scores. The exercise data is stored in database 108 of the exercise management server 102. Evaluation dashboard module 112 provides analysis tools, including playback capabilities, and produces a set of dynamic documents to assist white team members with debriefing and AAR's. Planning and evaluation dashboard modules 110, 112 may be implemented as web applications that interface with backend data stored in database 108 and that may, in some cases, be deployed onto white team (evaluator) computing system 122. White team members can therefore access such data in many ways using computing system 122 and/or exercise management server 102, including wirelessly via mobile devices or remotely via the Internet.

Agents 114 deployed by exercise management server 102 do not necessarily require any pre-installed infrastructure on exercise host computing systems 120, which reduces the effort required to deploy agents 114 and accommodates dynamic changes to exercise networks. Agents 114 may emphasize the forensic principle of non-interference by minimizing their footprint within an exercise, both temporally and spatially, which may add to the realism of an exercise. Agents 114 can be ephemeral, such that they do not necessarily have to stay resident on exercise host computing systems 120 over extended amounts of time, which can reduce the chance that trainees will be able to "game the system" by observing or altering agents 114.

Agents 114 can be launched on demand or run throughout the exercise, so exercise management server 102 can use either a pull model or a push model for data acquisition from the agents. The pull model is, in some cases, more flexible and has a lighter footprint, but the push model may, in certain cases, have better performance. Agents 114 can operate on physical hosts over the exercise's test range network or can operate on virtual machines directly through the hypervisor, without leaving any traces on the network. Exercise host computing systems 120 may comprise one or more virtual machines. In some examples, agents 114 use a three-layer modular design that includes a number of prebuilt plugins for hypervisors, operating systems, and performance metrics. This provides the flexibility to support a wide variety of platforms and missions.

In various non-limiting examples, there are seven common steps or aspects in building a VR training exercise: objectives, approach, topology, scenario, rules, metrics, and lessons learned. In one use case, it is assumed that the white team has already identified objectives, approach, topology, scenario, and rules. One or more aspects of the present disclosure help capture these artifacts, guide the white team through establishing metrics, and help disseminate lessons learned. In another use case, the white team has done almost no planning, and one or more aspects of the present disclosure supports white team members through the workflow, starting from exercise creation.

Exercise host computing systems 120 illustrated in FIG. 1 may execute one or more operating systems (e.g., Windows or Linux). These computing systems 120 may execute natively compiled ones of agents 114 that dynamically load natively compiled plugins. These plugins measure specific types of metrics during an exercise. Along with the plugins, parameters are passed to the agents that specify the behavior of the plugin, including what data it collects and how long it should run. For example, an agent may be compiled to run on Windows, load a plugin designed to inspect a Windows host's network configuration, load parameters that specify that the plugin return a list of open network ports to exercise management server 102, and then terminate. This list is used to inform assessment functionality. For example, a trainee may be required to secure a host by filtering certain ports.

As a non-limiting example, one of agents 114 may comprise a file watcher agent that stays resident on a target exercise host computing system of systems 120 and alerts exercise management server 102 as to changes in files. Its parameters include a list of files and/or directories to watch and how long to continue watching. It will notify exercise management server 102 when a file changes and indicate the nature of the change (e.g., file was created, renamed, written to, read, deleted). As another example, one of agents 114 may comprise a session monitor agent that returns a list of user login/logout events. This agent can be parameterized to return this list and terminate, or to stay resident and notify exercise management server 102 of any further logins/logouts as they occur.

Agents 114 may be configured for execution on one or more different types of architectures or operating systems, such as, for example, the Windows and/or Linux platforms. In general, the test range network comprising exercise host computing systems 120 may be a heterogeneous network that supports multiple different types of hardware architectures and operating systems. Agents 114 may also include one or more hypervisor agents, which are agents that do not deploy directly onto exercise host computing systems 120 in the test range network, but instead onto virtual machine platforms that host exercise host computing systems 120. Hypervisor agents may not leave any footprint (e.g., packets, network connections) on the exercise network for trainees to see. Further example details of one of agents 114 are illustrated below in FIG. 2.

During training exercises that are performed using exercise management server 102, exercise host computing systems 120, and computing system 122, trainees can be evaluated according to whether they accomplish high-level learning objectives. These trainees are able to meet each objective by demonstrating one or more skills during a VR training exercise. Demonstration of a skill can be measured with a set of metrics, which are calculated from VR training observables. In the present disclosure, VR training observables are generally represented by VR observables data. The observables data may include information regarding a speed or rate of a user's actions; location of an action, selection, or view within the virtual environment; a path travelled by the user with relation to virtual graphical objects; a time or speed for the path travelled by the user with relation to virtual graphical objects; and/or a selection of an action or other interaction from a set of possible actions. In various embodiments, there can be at least two types of VR observables data: measurements (e.g., determination of state of a virtual 3D training environment at a point in time), and events (changes to state of virtual 3D training environment at a point in time or during a period of time, e.g., resulting from a trainee interaction with the virtual 3D training environment). In an exemplary embodiment, VR observables data include interaction event data, representative of a trainee interaction with one or more interactive 3D virtual objects within a virtual 3D training environment while the trainee performs actions within a virtual 3D training environment. Agents 114 are configured to gather VR observables data from exercise host computing systems 120 in the VR training network, and these VR observables data are used by exercise management server to calculate one or more metrics that are displayed by evaluation dashboard module 112.

As shown in the example of FIG. 1, exercise management server 102 includes database 108, web server 106, and monitoring and transmission control system 104. In certain non-limiting examples, database 108 may comprise a standalone SQLite database that is linked to web server 106. Monitoring and transmission control system 104 may include or use two sub-components: an aggregator and remote command modules, which are operable to interact with remote agents deployed across the VR training network.

As one non-limiting example, a single instance remote command may be used for each one of exercise host computing systems 120 in the VR training network. These remote command processes or threads execute agents 114 on remote hosts and may receive agent output via, e.g., a Transmission Control Protocol (TCP) network connection. In some examples, agent output is formatted as Extensible Markup Language (XML) snippets, which provides a message-based communication format that is easily parsed and interpreted by monitoring and transmission control system 104. In these examples, the XML messages may be piped via standard out (STDOUT) and standard error (STDERR) to the aggregator component of monitoring and transmission control system 104, which saves them in the database 108 and also notifies event listeners for any actions to be taken. Web server 106 is updated by database 108, and evaluation dashboard module 112 may present the exercise status as a dynamic web page accessible by white team members.

Figure 6:
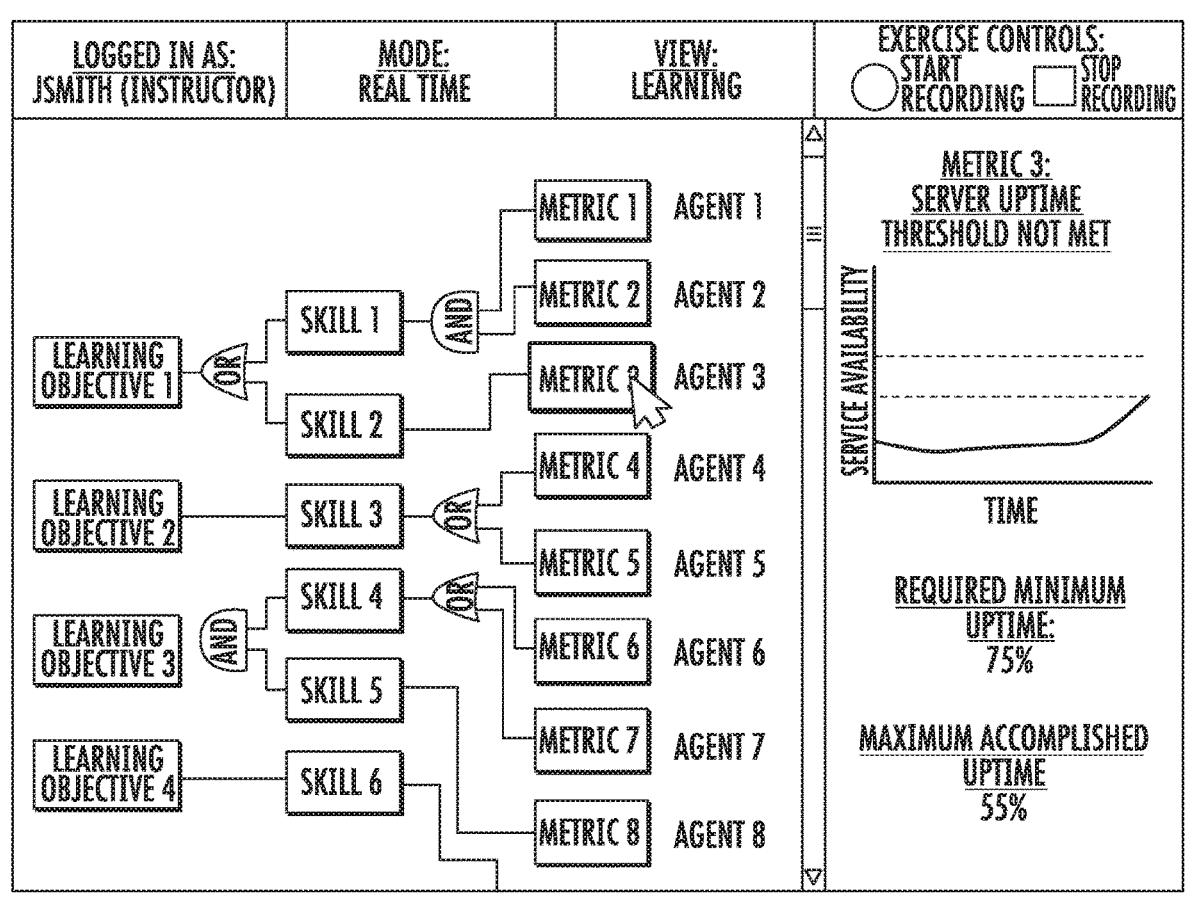
FIG. 6 is a screen diagram illustrating an example evaluation dashboard, according to an embodiment.
Figure 9:
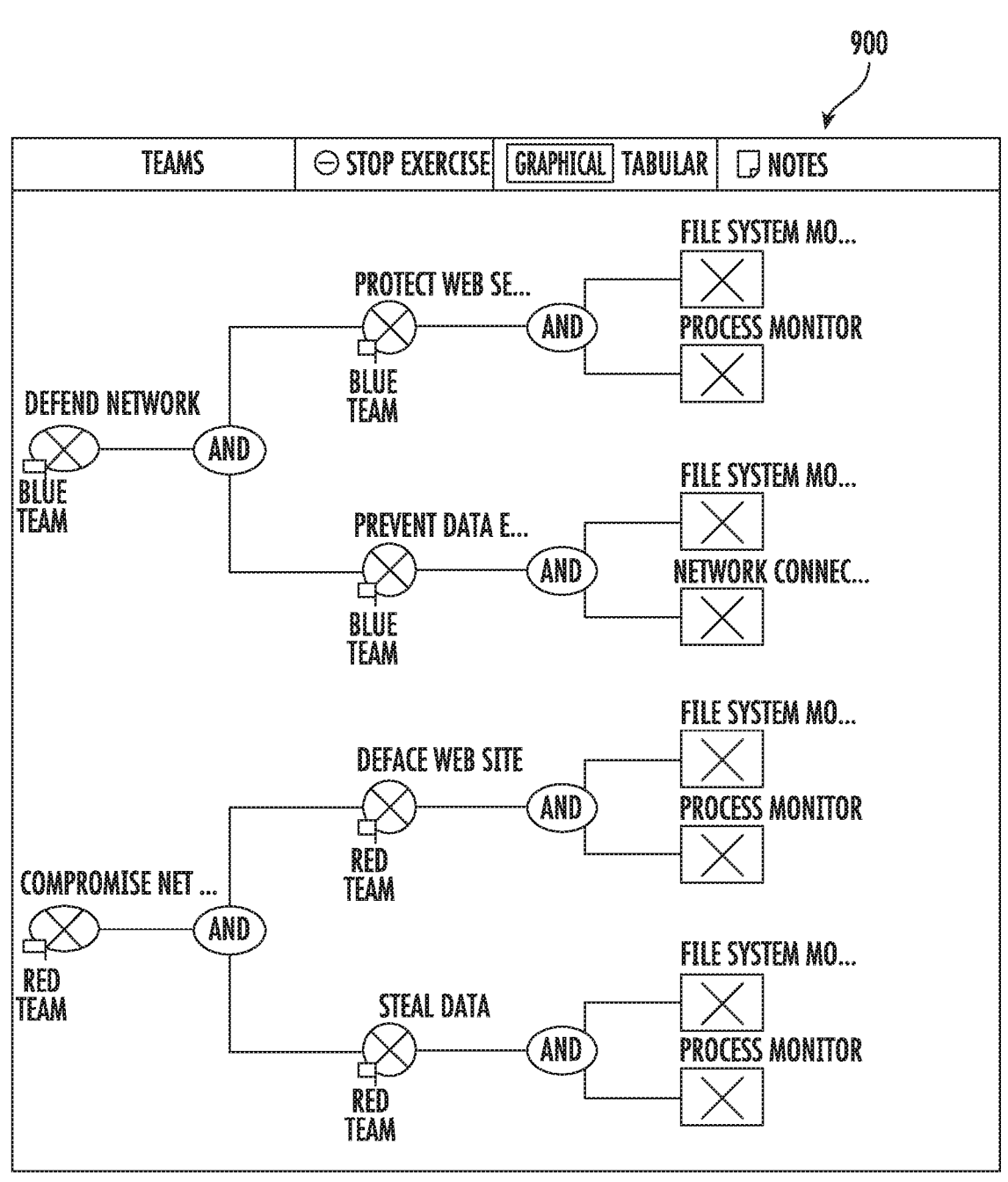
FIG. 9 is a screen diagram illustrating an example learning view provided by an evaluation dashboard for a team exercise, according to an embodiment.

One or more techniques of the present disclosure may provide a method that includes outputting, by exercise management server 102 and for display, a graphical dashboard associated with a training exercise, wherein the graphical dashboard includes one or more skill nodes that represent one or more skills to be demonstrated by the trainee during the training exercise, and wherein the one or more skill nodes graphically indicate that the one or more skills have not yet been demonstrated by the trainee. In an embodiment, the dashboard further includes a learning objective node that represents a learning objective to be accomplished by a trainee during the training exercise, and the one or more skills support the learning objective. Examples of such a dashboard are illustrated in FIGS. 6 and 9. Exercise management server 102 may select one or more software agents of agents 114 that are associated with the one or more skill nodes and provide to at least one host computing system of exercise host computing systems 120, an indication of the one or more software agents that are executed during the training exercise. In various embodiments, exercise management server 102 sends the one or more software agents for execution by the at least one host computing system, wherein the one or more software agents are configured to collect VR observables data from the at least one host computing system while the trainee performs actions during the training exercise. Exercise management server 102 receives from the at least one host computing system the VR observables data collected by the one or more software agents during execution, and determines, based on the VR observables data, that the one or more skills represented by the one or more skill nodes have been demonstrated by the trainee during the training exercise. Responsive to determining that the one or more skills have been demonstrated, exercise management server 102 is capable of updating, for display, the one or more skill nodes to graphically indicate that the one or more skills have been demonstrated by the trainee during the training exercise.

Example implementations of exercise management server 102, as described herein, provide flexibility to work with a wide variety of training platforms and missions in the VR training network that includes exercise host computing systems 120. User interfaces and dashboards generated by planning dashboard module 110 and evaluation dashboard module 112 may be user-friendly and workflow-driven, potentially decreasing the burden of deployment and monitoring on white team members.

The architecture may be extensible, customizable, secure, accessible, and robust. The design modularity can easily accommodate new training platforms and needs of specific users within the test range network, and agents 114 can be easily modified based on the architecture of the test range network and the specifics of particular training exercises. Agents 114 also may utilize encryption and out-of-band channels to guard against trainees "gaming the system," and are capable of recovering from network interruptions and host reboots. In addition, interfaces provided by exercise management server 102 may be remotely accessible by white team members, even through the use of mobile devices, via white team computing system 122 and any additional computing systems communicatively coupled to exercise management server 102.

Figure 2:
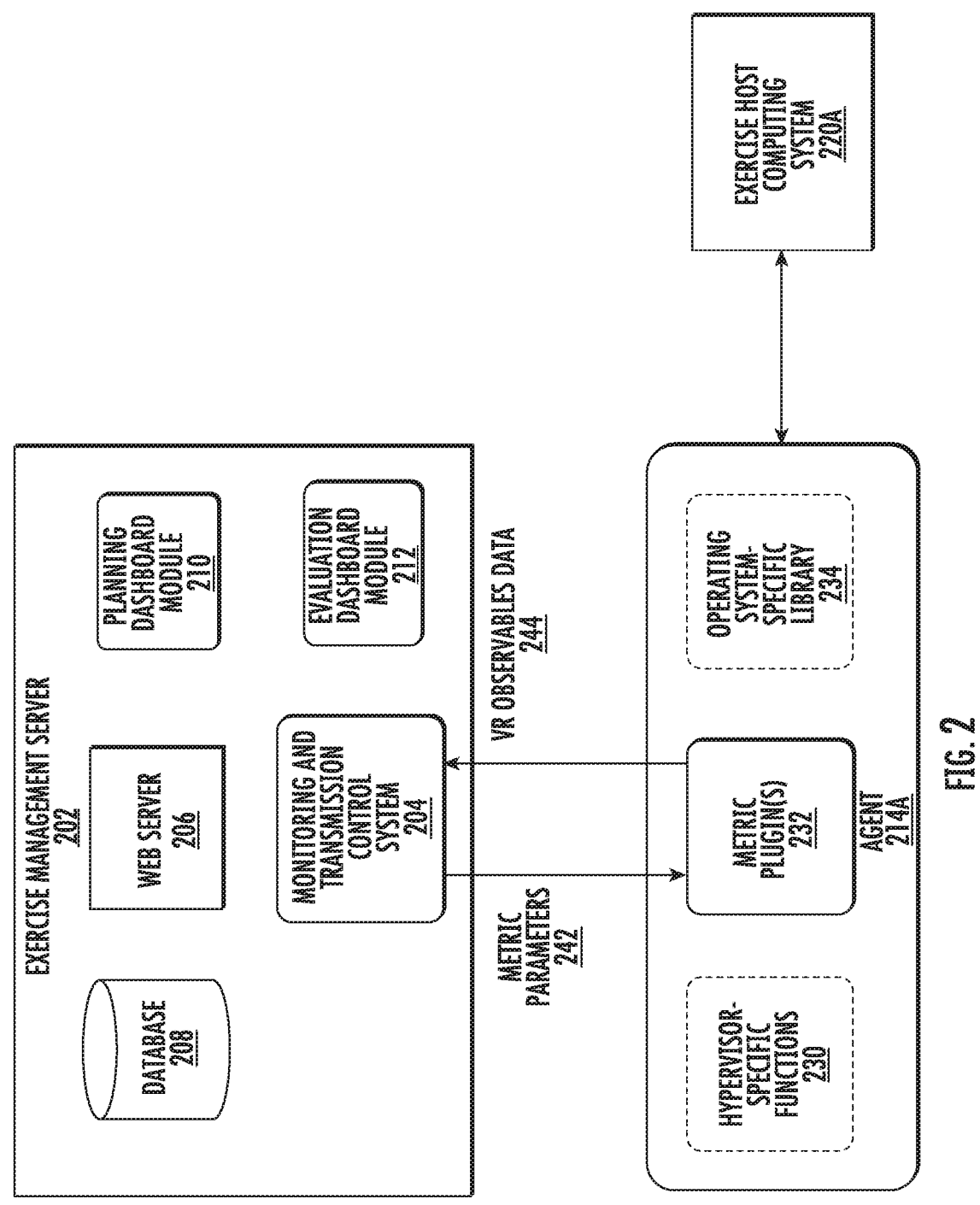
FIG. 2 is a block diagram illustrating an example agent and an example exercise host computing system, according to an embodiment.

FIG. 2 is a block diagram illustrating an example agent 214A and an example exercise host computing system 220A, in accordance with one or more techniques of the present disclosure. Agent 214A is an example of one of agents 114 illustrated in FIG. 1 that may be deployed by exercise management server 202, and exercise host computing system 220A is an example of one of exercise host computing systems 120 illustrated in FIG. 1.

In the example of FIG. 2, the agent design provides the flexibility to run on a wide variety of target systems, such as exercise host computing system 220A. As described above in reference to FIG. 1, agents 114 may include one or more hypervisor agents, which are agents that do not deploy directly onto exercise host computing systems 120 in the VR training network, but instead onto virtual machine platforms that host exercise host computing systems 120. Exercise host computing systems 120 may comprise one or more virtual machines. Hypervisor agents may not leave any footprint (e.g., packets, network connections) on the exercise network for trainees to see. In the example of FIG. 2, agent 214A may, in some non-limiting cases, comprise a hypervisor agent that comprises one or more hypervisor-specific functions 230.

In these cases, hypervisor-specific functions 230 may provide access to the one or more virtual machines. In one example, a console can be established through a virtual machine's virtual serial port. In one example, a Virtual Machine Communications Infrastructure (VMCI) provides communication between a virtual machine and a host operating system of host computing system 220A using a socket interface. In one example, a Host-Guest Communication Manager (HGCM) allows a virtual machine to call a shared library on host computing system 220A.

In some examples, however, agent 214A may not comprise a hypervisor agent and may not include hypervisor-specific functions 230. In these examples, agent 214A may be deployed directly on exercise host computing system 220A.

FIG. 2 shows that agent 214A can be equipped with one or more metric plugins 232 to collect and provide monitoring and transmission control system 204 of exercise management server 202 with VR observables data 244 during a training exercise using exercise host computing system 220A. Furthermore, these metric plugins 232 can be parameterized to further broaden their application for increased flexibility. Metric plugins 232 may be parameterized by receiving, for example, one or more metric parameters 242 from monitoring and transmission control system 204.

Once deployed, an agent, such as agent 214A, is a program that executes and that may have a callback interface for returning information to monitoring and transmission control system 204. Agent 214A may run with administrator privileges to ensure maximum access.

In general, agent 214A and metric plugins 232 can be written to provide a wide range of functions. The following are non-limiting examples of the types of agents that may be implemented: (1) general execution agent—an agent that runs an arbitrary shell command on exercise host computing system 220A. This type of agent can be parameterized (e.g., by receiving metric parameters 242 from monitoring and transmission control system 204 to return all stdout/stderr results from exercise host computing system 220A or return only results including a regex). (2) process monitor agent— an agent that uses an application programming interface of the operating system of exercise host computing system 220A to acquire a list of processes running on exercise host computing system 220A. This type of agent can be parameterized to return the full list or only return processes that match a given regular expression. (3) remote connection agent—an agent that uses host computing system's network access to attempt connections to another host. This type of agent can be parameterized with the Internet Protocol address and port number of exercise host computing system 220A, and optionally a client protocol to emulate. The agent will return success or failure of the attempted connection, and can also return any packets received from exercise host computing system 220A. (4) registry monitor agent—an agent that monitors the registry of exercise host computing system 220A for key changes. This type of agent can be parameterized to monitor only keys matching a regex, and will return the new value of any keys. (5) time check agent—an agent that executes on each target (e.g., on exercise host computing system 220A) at the beginning of an exercise (e.g., at a minimum) so exercise management server 202 can record the time differentials between exercise host computing systems 220 and exercise management server 202 and accurately report monitoring results. The time check agent may be used in cases where the clocks of each of exercise host computing systems 220 are not necessarily synchronized.

Another type of parameter that may be included in metric parameters 242 is an agent's operational mode. The principal modes for agents 114, according to certain examples, are to either terminate after executing their respective commands or to stay resident for the purposes of returning additional data at a later time. In the latter case, a persistent agent can either actively poll the state of exercise host computing system 220A (e.g., to take repeated measurements) or use an operating system hook (e.g., via option operating-system specific library 234, which may be specific to the operating system used by exercise host computing system 220A) to passively monitor exercise host computing system 220A and wait for events. In various examples, agents 114, including agent 214A, are capable of running in each of these modes.

In some cases, VR observables data 244 may indicate at least one event that is associated with at least one action that is performed by a trainee within a virtual 3D training environment during a training exercise using exercise host computing system 220A.

In various examples, planning dashboard module 210, evaluation dashboard module 212, and/or monitoring and transmission control system 204 may determine one or more metrics that are usable to determine if one or more skills have been demonstrated by a trainee during a training exercise. These components can identify certain types of VR observables data that can be collected by exercise host computing system 220A in order to calculate these one or more metrics. Monitoring and transmission control system 204 may then provide metric parameters 242 to configure metric plugins 232 of agent 214A to collect the VR observables data, including in VR observables data 244, which is used to calculate these metrics for use by evaluation dashboard module 212. Evaluation dashboard module may then determine whether one or more skills represented by one or more skill nodes in a graphical dashboard have been demonstrated by the trainee during the training exercise by calculating, based on VR observables data 244, the one or more metrics to determine if the one or more skills have been demonstrated.

Figure 3:
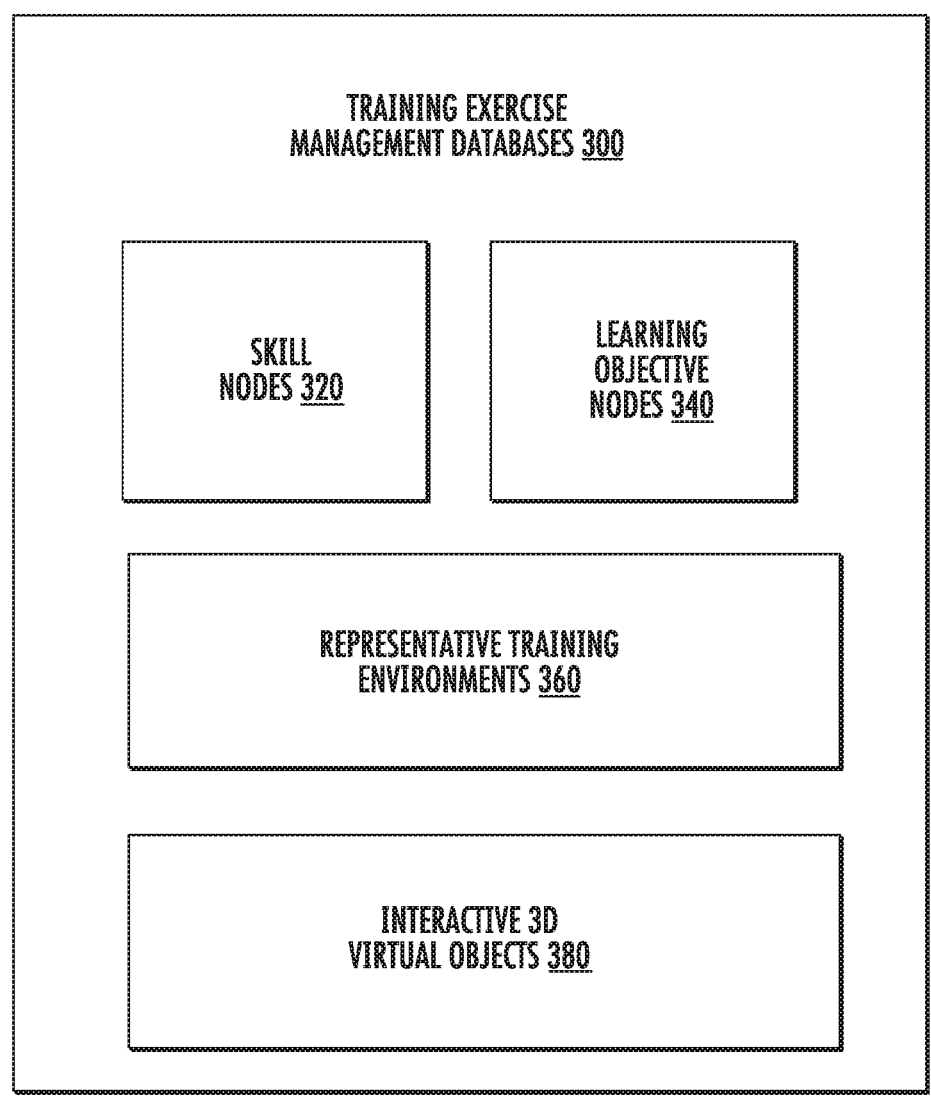
FIG. 3 is a block diagram illustrating example training exercise management databases, according to an embodiment.

FIG. 3 is a block diagram illustrating example exercise management databases 300 in accordance with the present disclosure. Databases 300 are an example of the database 108 associated with exercise management server 102 of FIG. 1. In various embodiments, Skill Nodes 320 represent one or more skills, wherein the one or more skills support one or more learning objectives represented by Learning Objective Nodes 340. In an embodiment, Skill Nodes 320 define one or more metrics that can be used to determine if each skill is accomplished. In an embodiment, Learning Objective Nodes reflect underlying training scenarios to be implemented as immersive and effective training simulations in a virtual three dimensional (3D) training environment. In an embodiment, learning objective nodes 340 are organized in a logic tree, e.g., mapping learning objectives of a training scenario into high level objectives, progressing into more detailed learning objectives.

In an embodiment, VR training scenarios measure observation and orientation skills based on the OODA loop developed by United States Air Force Colonel John Boyd. The OODA loop (Observe, Orient, Decide, Act) is a four-step approach to decision-making that focuses on filtering available information, putting it in context and quickly making the most appropriate decision while also understanding that changes can be made as more data becomes available. The observe step identifies the problem or threat and gains an understanding of the internal and external environment. The orientation step reflects on what has been found during observations and considers what should be done next, e.g., based on situational awareness and understanding. The decide step makes an informed decision, having gathered information and oriented the actor, and the actor executes this decision in the act step. Considering the OODA loop as a cycle, any information which the actor gathers from the results of his actions can be used to restart the analytical process.

In an exemplary embodiment, a VR training scenario incorporates a series of learning objectives based on the OODA loop to be accomplished sequentially by the trainee during the training exercise, wherein the VR training scenario includes skill nodes supporting the learning objectives. A virtual 3D training environment includes a series of interactive 3D virtual objects and the training exercise monitors interaction event data representative of trainee interactions with these interactive 3D virtual objects demonstrating observation, orientation, and action skills. In an example, a training scenario involving maintenance, repair and overhaul (MRO) of equipment included skill nodes requiring the trainee to discover and address a series of fault conditions via inspection, repair, and testing. The fault conditions were modeled as interactive 3D virtual objects within a virtual 3D training environment simulating the equipment.

Visual observations are the primary type of observation skills, such as tracking and visual diagnostic skills, in VR 3D training environments. Observations in VR 3D training environments also can include auditory observations, such as environmental sounds, verbal commands and instructions, and alarms.

Representative Training Environments 360 comprise interactive 3D audio-video content that depicts training scenarios. In an embodiment, Representative Training Environments 360 support an immersive training experience. In various embodiments, Representative Training Environments 360 incorporate interactive 3D virtual objects 380 as key component of virtual three dimensional (3D) training environments. In an embodiment, Representative Training Environments 360 incorporate automated training monitoring. Expressive communication between the client state and a monitoring platform can reinforce positive training behavior.

In various embodiments, representative training environments 360 includes CGI imagery tailored to accurately reflect real-life analogs. In an embodiment, both visual effects (VFX) and live action photography may be used in production of representative training environments. In various embodiments, representative training environments may incorporate pre-existing imaging assets, such as CAD files for equipment featured in representative training environments.

In an embodiment, representative training environments utilize VR photography techniques to capture or create a complete scene as a single image, as viewed when rotating about a single central position. Often created by stitching together a number of photographs taken in a multi-row 360-degree rotation or using an omnidirectional camera, the complete virtual reality image can also be a totally computer-generated effect, or a composite of photography and computer generated objects complete virtual reality image can also be a totally computer-generated effect, or a composite of photography and computer generated objects.

In an embodiment, representative training environments 360 incorporate interactive 3D virtual objects 380 within virtual three dimensional (3D) training environments. In an embodiment, representative training environments 360 incorporate VR panoramas as an interactive way to observe a scene in a wide angle panorama using a full 360° seamless image of an object that incorporates the object's whole surroundings in a single frame. In an embodiment, VR panoramas allow a substantially spherical or cylindrical field-of-view to be captured, digitally processed, and presented to a trainee in the form of a fully immersive perspective image. In an embodiment, VR panoramas permit the same panoramic image or panoramic video to supplied simultaneously to multiple trainees (viewers), and each trainee can view a different portion of the image or video, independent from other trainees.

In an embodiment, representative training environments 360 incorporate interactive 3D virtual objects 380 within virtual three dimensional (3D) training environments. In an embodiment, interactive 3D virtual objects 380 include a plurality of object states used in collective VR observables data during training exercises. In an embodiment, VR observables data comprises one or both of a state of the virtual 3D training environment at a point in time, and a change to state of the virtual 3D training environment at a point in time or during a period of time.

In an embodiment, interactive 3D virtual objects 380 include a plurality of object states representative of visualization attributes of the interactive 3D virtual objects 380. In an embodiment, visualization attributes include one or more of magnification, orientation, openness (i.e., uncovered state), brightness, contrast, resolution, and level of detail.

In various embodiments, host computing systems automatically monitor interaction event data representative of trainee interactions with one or more of the interactive 3D virtual objects 380 during a 3D training exercise. In an embodiment, the VR training system automatically monitors one or more trainee input actions performed within a virtual 3D training environment correlated with the state of each of the one or more of the interactive 3D virtual objects 380. In an example, a host computing system automatically monitors magnification, resolution, and level of detail as a trainee approaches and observes an interactive 3D virtual object

380. The system detects a state transition of level of detail associated with a discovery training objective. In another example, a host computing system automatically monitors orientation and openness as a trainee reorients and observes an interactive 3D virtual object 380. The system detects a state transition of visibility of an object feature associated with a discovery training objective.

Figure 4:
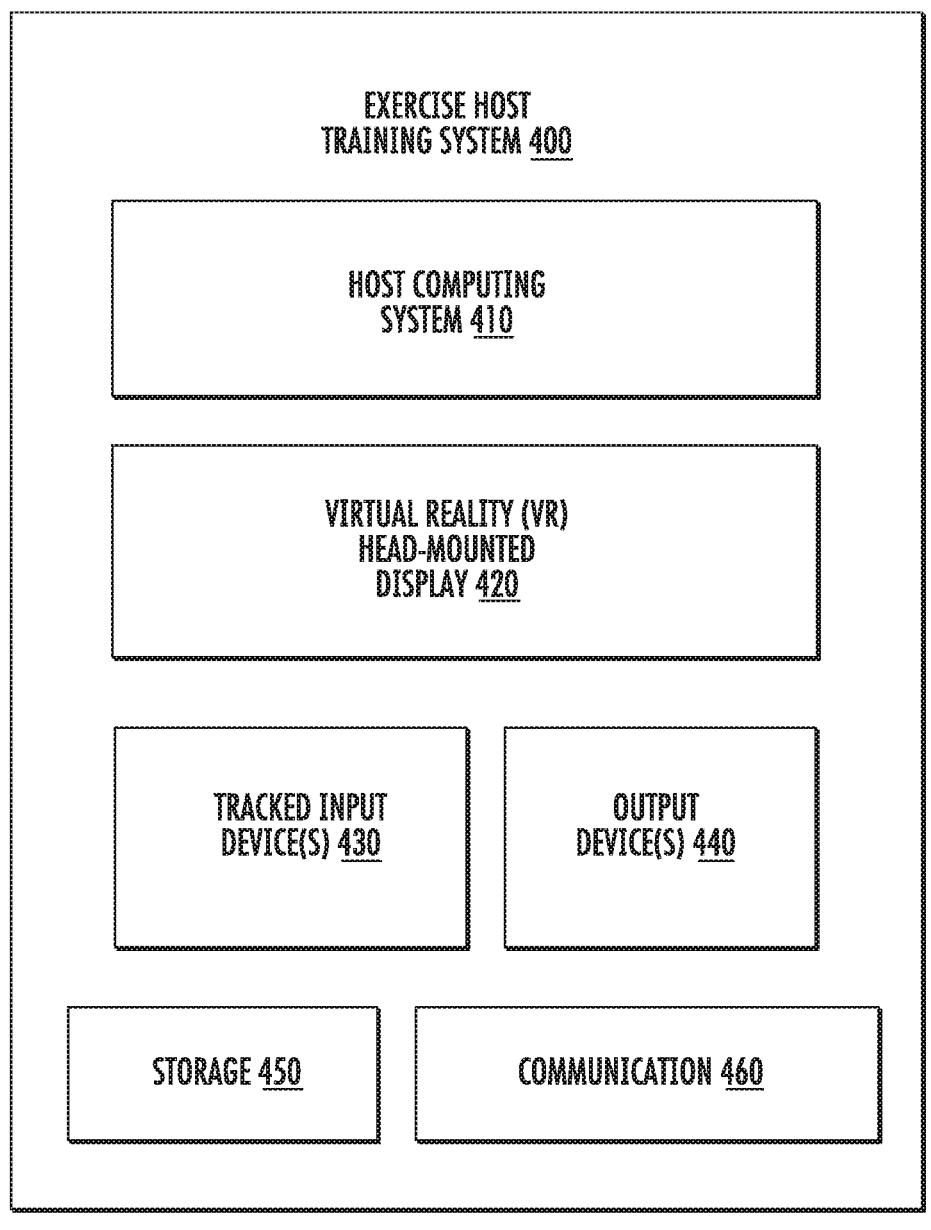
FIG. 4 is a block diagram illustrating an example exercise host training system, according to an embodiment.

FIG. 4 is a block diagram illustrating an example exercise host training system 400 in accordance with the present disclosure. System 400 is an example of the exercise host computing systems 120 of FIG. 1. Exercise host training system includes a host computing system 410 operatively coupled to a near-to-eye display 420, e.g., a VR head-mounted display. As used in the present disclosure, near-to-eye displays are display devices that incorporate some sort of near-to-eye optical system to emit a light image, generally located within a few centimeters of the human eye. Near-to-eye displays allow the user to view a scene at a perspective such that it appears to the eye as watching a high definition display screen at some distance.

One type of near-to-eye display is a head-mounted display (HMD). As used in the present disclosure, a HMD is a near-to-eye display device worn on or about the head. Single eye head-mounted displays are referred to as monocular HMDs while dual eye head-mounted displays are referred to as binocular HMDs. HMDs can by integrated, e.g., in a helmet, eye wear or goggles.

As used in the present disclosure, a VR display denotes near-to-eye displays that display only a computer generated image ("CGI"), as well as near-to-eye displays that display a CGI in combination with a real world physical environment. The latter type of VR display is sometimes called an augmented reality (AR) display herein. Typically AR displays employ HMDs with see-through near-to-eye displays that are worn by users to view mixed imagery of virtual and real-world objects.

As used in training applications, the first type of VR display immerses a trainee in a virtual training experience, while the second type of VR display permits a trainee to view CGI training information without taking his eye off a real-world training environment. Exemplary training applications of the first type of VR display use VR HMDs to display CGI in training simulations involving expensive equipment or hazardous training conditions. In an exemplary training application of the second type of VR display, VR training deploys an AR-type HMD to display CGI training information while a trainee navigates a real world wargaming environment. In another exemplary use case, VR training deploys AR-type HMD in a multi-domain command and control training scenario in which training in a cyber-domain is presented via CGI, while training in an air, land, or sea operational domain is presented within a real world training environment.

Exercise host training system 400 further includes tracked input device(s) 430. At least one tracked input device 430 is communicatively coupled with the host computing system 410. In an embodiment, the at least one tracked input device 430 is configured to transmit trainee inputs to the host computing system to generate trainee actions within the virtual 3D training environment. In an embodiment, the at least one tracked input device(s) 430 includes one or more of a joystick, hand-held keypad, a device for tracking movements of the trainee's arms and hands, a cyberglove, a device for tracking movements of the trainee's retina or pupil, a touch gesture sensor, a tactile input device with reaction force generator, voice recognition, motion tracker bodysuit, treadmill, camera, biometric sensors, and other sensors. In an embodiment, the at least one tracked input device(s) 430 includes a virtual input device. The host computing system 410 is configured to generate an image of a virtual input device for display by the near-to-eye display device 420, and to track trainee gestures relative to the virtual input device to generate the trainee actions within the virtual 3D training environment. In other embodiments, the at least one tracked input device 430 is configured to transmit trainee inputs to a computing device of host computing system 410, such as a PC or mobile device.

Additional components of exercise host training system 400 include one or more output device(s) 440, storage 450, and communication interface 460. Exemplary output devices 440 include a large screen display for a workstation 400; e.g., for displaying training dashboards; a small screen display for a trainee mobile device 400; and speakers. Examples of storage 450 include random access memory (RAM), read-only memory (ROM), flash memory, and the like. Examples of storage 450 include magnetic and/or optical recording medium, ferro-electric RAM (F-RAM) hard disks, solid-state drives, floppy disks, optical discs, and the like. In one embodiment, storage 450 includes memory and a storage device that store information and instructions for execution by host computing system 410. In another embodiment, host computing system 410 includes a microprocessor, an application specific integrated circuit (ASIC), or a field programmable object array (FPOA), and the like. In this embodiment, host computing system 410 interprets and executes instructions retrieved from storage 450. Examples of communication interface 460 include mechanisms that enable host computing system 410 to communicate with other host computing systems and/or with exercise management server 102 through communications networks. Examples of communications networks include any connections between computers, such as, intranets, local area networks (LANs), virtual private networks (VPNs), wide area networks (WANs), the Internet, and the like.

FIG. 5 illustrates a list 500 of agents and/or metric plugins for agents 114 utilized with respective ones of exercise host computing systems 120. As indicated in the list of FIG. 5, a file system monitor agent/plugin reports changes to files in a specific directory (and all subdirectories) for a given host computing system. A login test agent/plugin attempts to create a session (e.g., log in) with the user-specified log-in credentials. An email sender agent/plugin attempts to send a "test" email message to a specified server (e.g., Simple Mail Transfer Protocol server). A network connection list agent/plugin lists all active network connections on a host computing system. A network connection monitor agent/plugin monitors network connections with a given host computing system. A process list agent/plugin is configured to list currently running processes on a host computing system. A process monitor agent/plugin monitors running processes on host computing system and reports when processes whose name matches a user-specified pattern starts or stops.

As also indicated in FIG. 5, a program list agent/plugin lists installed applications on a given host computing system. A registry monitor agent/plugin reports when changes are made to a registry (e.g., Windows registry) of a host computing system. A remote port monitor agent/plugin checks for open network ports on remote hosts and attempts to establish a network connection to a remote host on a specified port. Examples of how this plugin can be used include checking if services (e.g., web or ssh servers) are or are not running or if a firewall is configured property. A session monitor agent/plugin monitors active user sessions (e.g., looks for currently logged-on users). A webpage search agent/plugin attempts to retrieve a web page from a remote host, and can optionally search the returned data for a user-specified regular expression.

In utilizing exercise management server 102, agents 114, and exercise host computing systems 120 shown in FIGS. 1 and 2 for VR training exercises, a first step may comprise capturing the information about the training scenario that is used to set up monitoring and evaluation. Planning dashboard module 110 may output a planning dashboard that leads the user through a series of steps using, e.g., graphical tools, forms, and/or drop-down menus to facilitate the process. If the white team has not already set up a VR training exercise, it can use exercise management server to specify a new one. In either case, the result of the first step may, in some cases, be a set of files in machine-parsable formats that contains the information about the exercise.

A second step may involve planning how the VR training exercise will be monitored and how trainees evaluated. The planning dashboard can guide the user through another series of steps, from learning objectives to agent selection. In an exemplary embodiment, the results will be a monitoring plan in a machine-parsable format and the set of agents 114 that will collect metrics during the exercise.

TR training exercise capture or creation begins, e.g., by drawing the VR training network's hosts and connections using a network builder interface (e.g., a drag-and-drop interface). Once the network topology is captured, the user specifies details for one or more of exercise host computing systems 120. The interface is operable to lead the user through this process starting with high-level information and working down to low-level information. At each step, the interface is populated with options for the user.

Monitoring planning begins with the user providing learning objectives for the VR training exercise. The interface leads the user through a series of steps to produce a detailed monitoring plan. The process is repeated until all learning objectives are covered, with sufficient fidelity for each objective. The iterative process may include the following operations for each objective: (1) identifying a high-level learning objective; (2) identifying one or more skills that support the high-level objective; (3) defining one or more metrics that can be used to determine if each skill is accomplished (e.g., one or more defined state changes of interactive 3D virtual objects within the virtual 3D training environment); (4) identifying one or more VR observables data that can be collected from an exercise host computing system operatively coupled to a near-to-eye display device to calculate the metrics from the VR observables data (e.g., VR observables data representative of trainee interactions with one or more of interactive 3D virtual objects within the virtual 3D training environment); (5) selecting an agent capable of collecting the VR observables data (e.g., a binary execution agent or a file watching agent); and (6) configuring each agent with metric parameters.

As a final step, white team members may produce a scoring rubric to determine how trainee performance will be quantified, or other trainee communication of expectations of quality around a task. The rubric or other trainee communication may incorporate the metrics, along with weighted values for each.

A further aspect of the training process is generation of briefings. White team members use the interface provided by exercise management server 102 to produce dynamic documents (e.g., web pages with configurable content) that can be viewed online or printed out. The full contents of briefing documents are visible to white team members (e.g., via computing system 122), and filtered versions are made available to trainees to prepare them for the exercise. In an embodiment, the white team configures the filtering to control how much information to provide to trainees.

Briefing documents can include information from both the exercise capture step and the monitoring planning step. The dashboard interface is capable, in some instances, of translating the exercise information and monitoring plan files into human-readable form and it allows white team users to select which aspects to share with students. The documentation can include information like network topology, scenario back-story, mission objectives, learning objectives, rules, and evaluation criteria. White team members can filter out critical information from the trainees' documentation, such as providing only partial network topology or specific scoring metrics.

The following items list some examples of information found in briefings, with examples of how the information could also be filtered for trainees: (a) full scenario description (exemplary filter: only show trainees the backstory); (b) network topologies (exemplary filter: only show trainees their local topology); (c) mission objectives; (d) learning objectives; (e) rules (show all); (f) quiz questions (exemplary filter: only show trainees questions without "spoilers"); and/or (g) performance metrics (exemplary filter: show none of these to trainees).

One of the potential challenges of computer-based training exercises is their emergent nature and unpredictability. Exercise management server 102 accounts for this by allowing monitoring plans to be modified during exercises. For example, planning dashboard module 110 may be configured to allow the planning dashboard to be re-visited while an exercise is in progress to design new agents on the fly or to adjust the assessment rubric.

Evaluation dashboard module 112 is configured to output an evaluation/monitoring dashboard that may be used in real-time during the course of a training exercise. The evaluation/monitoring dashboard may provide one or more user interfaces for each of its operating modes. Each operating mode may, in some cases, have separate views focused on network topology, learning objectives and agent data feeds. Each operating mode has different exercise controls; for example, in live mode, a user can start or stop monitoring, and in replay mode, the user can play back or pause agent telemetry.

In some examples, exercise management server 102 outputs agent data in real time and displays it on a network diagram as it is received. For example, evaluation dashboard module 112 may output an evaluation/monitoring dashboard for display to a user (e.g., evaluator, instructor) via, e.g., white team (evaluator) computing system 122. When an agent sends new data from a host computing system to the interface (e.g., provided by monitoring and transmission control system 104), the representation of that host in the dashboard may blink, and the number of pending agent reports is displayed. Users can click on the representation of the host to drill down to see detailed agent reports for the host.

FIG. 6 is a screen diagram illustrating an example evaluation dashboard 600, in accordance with one or more aspects of the present disclosure. White team members may use the evaluation dashboard to monitor exercises in real time. The web interface can be accessible from mobile devices such as tablets and smartphones (e.g., computing system 122; FIG. 1), so white team members can "float" during an exercise rather than be tied to a workstation. Once an exercise is over, the metrics collected can be analyzed and even played back on the evaluation dashboard. Finally, white team members can use the evaluation dashboard to produce debriefing or after action "hot wash" reports for trainees, reviewing the exercise and student performance.

The evaluation/monitoring dashboard 600 may be implemented using similar techniques and tools to the planning dashboard. It may include a back end and a front end. In some examples, the evaluation dashboard has three main purposes: to monitor an exercise, assess trainee performance, and prepare debriefing documents. Because data collected by agents during an exercise can be viewed in real time or after the fact, the monitoring and assessment tasks may share the same interfaces. They only differ in whether they are viewing results live or in replay, as indicated in the "Mode" field shown in FIG. 6. Each of these modes will have different controls available to the user.

The dashboard 600 may provide three different views: network, learning, and agent. In some examples, additional views might include an exercise event timeline or advanced assessment analytics. The network view shows the exercise's VR training range network and details of the host computing systems included in this network (e.g., details of exercise host computing systems 120). The interface will promote situational awareness on the status and health of the exercise's VR training range infrastructure. The network view shows the exercise host computing systems, their status, and agent activity. Users can drill down into the specifics of an exercise host computing system and its monitoring results by clicking on the host's icon.

The learning view shows the white team what progress the trainees are making towards the exercise learning objectives. It indicates the relationships between learning objectives, skills, and metrics that were created using the evaluation and/or planning dashboard, and may present this information in a directed graph. The graph may indicate one or more hierarchical relationship between nodes, such as between skill nodes and learning objective nodes. The learning view (e.g., graphical tree) enables an instructor to define high level objectives for an exercise, skills that a student should demonstrate that supports those objectives, and agents that report when skills have been demonstrated. The "View" field in the example of FIG. 6 indicates that the dashboard is set for the "Learning" view. The directed graph is displayed on the left of the learning view. Metrics for which threshold values have been met may be marked in a particular color (e.g., green) or other representation (e.g., other graphical indication or emphasis), and this status propagates up the graph to determine which learning objectives are met.

The dashboard 600 may also include one or more operator nodes to represent operations associated with or between objective nodes, skill nodes, and/or metric/agent nodes. These operator nodes may, for example, include nodes representing logical AND or OR operations. As shown in the example of FIG. 6, "Learning Objective 1" may be achieved or completed if either "Skill 1" or "Skill 2" has been demonstrated, while "Learning Objective 3" may only be achieved or completed if both "Skill 4" and "Skill 5" have been demonstrated. "Skill 1" may be demonstrated if both "Metric 1" and "Metric 2" have been collected, observed, or otherwise determined. "Skill 3" may be demonstrated if either "Metric 4" or "Metric 5" have been collected, observed, or otherwise determined, and "Skill 4" may be demonstrated if either "Metric 6" or "Metric 7" have been collected, observed, or otherwise determined.

In the example of FIG. 6, metrics for which threshold values have been met are "Metric 1," "Metric 2," "Metric 4," and "Metric 7." Accordingly, "Skill 1", "Skill 3," and "Skill 4" have been demonstrated, and both "Learning Objective 1" and "Learning Objective 2" have been completed or achieved.

Clicking on a metric will display details of that metric on the right side of the learning view, including the current value of the metric and the success threshold identified in the evaluation rubric (defined in the planning stage), and an indication of whether the threshold has been satisfied. In the example of FIG. 6, a user has clicked on a representation of "Metric 3," and the details of "Metric 3" are shown on the right side of the learning view, indicating that the server uptime threshold has not been met, because the required minimum uptime is 75%, while the maximum accomplished uptime is only 55% (at a given time in the exercise). A graph showing service availability versus time is also shown.

FIG. 7 is a screen diagram illustrating an example agent configuration form 700. As described above, each agent may be configurable to perform different tasks. A user (e.g., trainer, evaluator) may use the agent configuration form to set up or otherwise configure an individual agent.

In section 710 of the form, the user may select an individual agent (e.g., enter a new agent name of select the type of agent from a drop-down menu). In the example of FIG. 7, the user has selected the agent named "File System Monitor." The contents fields or sections named "Agent Options" 730 and "Evaluation Criteria" 740 in the form may change based on which agent is selected.

In section 720 of the form, the user may specify the number of points earned by the student when the agent returns data that is evaluated to true. Using section 730, the user may specify various options for an agent. The fields in section 730 determine how the agent runs and what data it looks for. In the example of FIG. 7, the File System Monitor agent monitors the indicated Directory using the indicated file name filter. Agent options can be numbers, strings, or regular expressions.

In section 740 of the form, the user may specify various evaluation criteria for the agent. The evaluation criteria section allows the user to identify what data is used to evaluate student performance. This is discussed in more detail below. In section 750 of the form, a drop-down menu is provided to select which computer in the exercise network (e.g., one or more of exercise host computing systems 120 the agent should be sent to.

Regarding the agent evaluation criteria, each agent may be configured to return tagged data that can be used to determine if the student actions are correct. FIG. 7 shows example evaluation criteria section for the "File System Monitor" agent. Each piece of tagged data returned by an agent can be evaluated to either True or False. In this example, the "File System Monitor" returns four pieces of tagged data, in which the labels in FIG. 7 are the tags used by the agent: "path," "status," "renamed to," and "change type." The center column is a drop-down menu with evaluation operations. Agents return either strings or numbers and the evaluation operations available reflect the data type.

To evaluate strings, example operations are the following: (a) "Contains": the Contains operation returns True if the data contains the user-specified substring; (b) "Equals": the Equals operation returns True if the data is the same as the user-specified string; and (c) "Not Equals": the Not Equals operation returns True if the data is different from the user-specified string. To evaluate numbers (e.g., integers), example available operations are the following: (a) "Equals;" (b) "Not Equals;" (c) "Less than;" (d) "Greater than;" (e) "Less than or equal to;" and (f) "Greater than or equal to." In various examples, during evaluation of agent data, the value of each field may be checked or monitored. If each operation results in True, then the agent as a whole evaluates to True.

FIG. 8 is a screen diagram 800 illustrating example exercise results that may be provided by the evaluation dashboard. The exercise results page shows an exercise report of a summary of a student's performance along with a breakdown of which objectives, skills, and agents evaluated to true. In the example of FIG. 8, the page includes a "Results Summary" section that includes a summary of the number and percentage of objectives, skills, and agents have evaluated to true in the learning view/graphical tree. Below the "Results Summary" is an itemized list of objectives, skills, and agents, as well as an indication as to whether each objective, skill, or agent has evaluated to true (e.g., objective achieved or accomplished, skill demonstrated, VR observables data satisfied one or more evaluation criteria) or false. In the section "Student Activity," the exercise results page lists specific VR observables data that has been collected and/or provided by one or more agents. Each group of event data may have an associated timestamp that corresponds to a time at which the event data was collected.

With further reference to FIG. 4, a VR training network can include multiple host computing systems 410 and multiple VR HMDs 420, respectively associated with different trainees. In various embodiments, multiple trainees within a VR training network 120 have access to the same virtual 3D training environment, which may be designed as a collaborative VR training environment. In various embodiments, the exercise management server executes a multi-trainee training environment including some or all of the following features: representations of presence of each trainee, e.g., via representative objects or avatars; visual indicator of location of each trainee; trainee IDs to control access privileges and trainee monitoring; synchronization of training exercise state; multiple trainee viewpoints; multiple interaction event locations.

In various embodiments, the planning dashboard module 110 may incorporate forms for assigning teams to training exercise objectives or skills, and the evaluation dashboard 112 may incorporate forms that provide team exercise results. FIG. 9 is a screen diagram illustrating a learning view (e.g., graphical tree) of a Team Dashboard section 900 of the evaluation dashboard. When running a team exercise, the learning objective and skill nodes display the team flag. In an embodiment, individual nodes have a particular color or include an "X" for corresponding objectives that have not yet been accomplished, skills that have not yet been demonstrated, and/or agents whose evaluation criteria have not yet been satisfied. In addition, logical operators (e.g., "AND" operators, "OR" operators) may be associated with one or more of the nodes in the hierarchy.

In an embodiment of Team Dashboard 900, individual nodes can be assigned to teams within the tree. Learning objective nodes and skill nodes can be assigned to teams based upon which corresponding objectives and skills have been assigned to teams. The objective of "Defend Network" is assigned to the "Blue" team, as indicated by text and/or a blue flag (or other representation associated with the "Blue" team), which is located adjacent to the learning objective node representing the "Defend Network" objective, as indicated in FIG. 9. The objective of "Compromise Net . . . " (Compromise Network) is assigned to the "Red" team, as indicated by text and/or a red flag (or other representation associated with the "Red" team), which is located adjacent to the learning objective node for the "Compromise Net . . . " learning objective.

Similarly, the skills of "Protect Web Se . . . " and "Prevent Data E . . . " are assigned to the "Blue" team, as indicated by text and/or blue flags (or other representations associated with the "Blue" team), which are located adjacent to the skill nodes representing the "Protect Web Se . . . " and "Prevent Data E . . . " skills. The skills of "Deface Web site" and "Steal Data" are assigned to the "Red" team, as indicated by text and/or red flags (or other representations associated with the "Red" team), which are located adjacent to the skill nodes representing the "Deface Web site" and "Steal Data" skills.

FIG. 10 is a flow diagram illustrating an example process that may be performed by a management server, such as exercise management server 102 illustrated in FIG. 1. In the example of FIG. 10, the process includes operations 1010, 1020, 1030, 1040, 1050, and 1060.

At step 1010, the illustrated process includes outputting, for display, a graphical dashboard associated with a training exercise, where the graphical dashboard includes one or more skill nodes that represent one or more skills to be demonstrated by the trainee during the training exercise. In an embodiment, the one or more skill nodes graphically indicate that the one or more skills have not yet been demonstrated by the trainee. In an embodiment, the graphical dashboard also includes one or more learning objective nodes that represent one or more learning objectives to be accomplished by a trainee during the training exercise, and the one or more skills support the one or more learning objectives.

At step 1020, the illustrated process includes selecting one or more software agents that are associated with the one or more skill nodes. At step 1030, the process includes transmitting to at least one host computing system, an indication of the one or more software agents that are executed during the training exercise, where the one or more software agents are configured to collect VR observables data (e.g., interaction event data) from the at least one host computing system while the trainee performs actions during the training exercise. At step 1030, the illustrated process also includes transmitting to at least one host computing system, representative training environments and a plurality of 3D virtual objects for execution in a 3D virtual training environment by the VR near-to-eye display.

At step 1040, the illustrated process includes receiving the VR observables data (e.g., interaction event data) collected by the one or more software agents from the at least one host computing system during execution. At step 1050, the illustrated process includes determining, based on the VR observables data, that the one or more skills represented by the one or more skill nodes have been demonstrated by the trainee during the training exercise. At step 1060, responsive to determining that the one or more skills have been demonstrated, the illustrated process includes updating, for display, the one or more skill nodes to graphically indicate that the one or more skills have been demonstrated by the trainee during the training exercise.

In one example, a plurality of users each utilize the virtual based training. As each user attempt to accomplish a particular task to demonstrate a skill, the system collects observable data that represents the user's actions. If that skill were to locate a certain item, then the observable data is used to represent the time it takes the item, the path taken by the user to locate or find the item, and actions taken during that time. In a challenge to find a hidden item, the skill may be based on the user's time to find that item. In a challenge involving operating on a patient, the skill may be based on the user performing the correct incision and quickly locating the object of a surgery. In a challenge involving fixing a mechanical device (e.g., a car), the skill may be based on locating the malfunctioning object, removing it, and replacing it with an operable one.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:

outputting, by a server and for display, a graphical dashboard associated with a training exercise, wherein the graphical dashboard further includes a directed graph comprising:

a plurality of metrics to be collected during execution of the training exercise;

a plurality of skill nodes that represent a plurality of skills to be demonstrated by a trainee during the training exercise;

a plurality of learning objectives;

indications of a first set of hierarchical relationships between the plurality of metrics and the plurality of skill nodes and a second set of hierarchical relationships between the plurality of skill nodes and the plurality of learning objectives; and a mapping of a plurality of software agents to the plurality of metrics;

selecting, by the server, the plurality of software agents that are associated with the the plurality of skill nodes, the plurality of software agents configured to collect virtual reality (VR) observables data for calculating the plurality of metrics corresponding to the plurality of skill nodes;

providing, by the server and to at least one host computing system, an indication of the plurality of software agents that are executed during the training exercise;

providing, by the server and to the at least one host computing system, one or more metric parameters to configure the plurality of software agents to calculate the plurality of metrics for determining whether the plurality of skills have been demonstrated, wherein each of the at least one host computing system is communicatively coupled to a near-to-eye display device configured to display a virtual three dimensional (3D) training environment including a plurality of interactive 3D virtual objects, wherein the plurality of software agents are configured to collect the VR observables data from the at least one host computing system while the trainee performs one or more trainee input actions within the virtual 3D training environment displayed by the near-to-eye display device, wherein the VR observables data match the one or more trainee input actions performed within the virtual 3D training environment to a state of each of one or more interactive 3D virtual objects of the plurality of interactive 3D virtual objects;

receiving, by the server, the VR observables data collected by the plurality of software agents during execution and the plurality of metrics calculated from the VR observables data;

automatically monitoring, by the server, the trainee input actions performed within the virtual 3D training environment using the VR observables data received from the plurality of software agents and the plurality of metrics calculated by the plurality of software agents from the VR observables data to determine whether the plurality of skills represented by the plurality of skill nodes have been demonstrated by the trainee during the training exercise;

responsive to determining that the one or more of the plurality of skills have been demonstrated, updating, by the server and for display, the graphical dashboard to indicate that the one or more of the plurality of skills have been demonstrated by the trainee during the training exercise; and responsive to determining that the one or more of the plurality of skills indicate that the trainee met a learning objective of the plurality of learning objectives, updating, by the server and for display, the graphical dashboard to indicate that the learning objective of the plurality of learning objectives has been met.

2. The method of claim 1, wherein the VR observables data match the one or more trainee input actions performed within the virtual 3D training environment to magnification of at least one interactive 3D virtual object of the plurality of interactive 3D virtual objects.

3. The method of claim 1, wherein the VR observables data match the one or more trainee input actions performed within the virtual 3D training environment to level of detail of at least one interactive 3D virtual object of the plurality of interactive 3D virtual objects.

4. The method of claim 1, wherein the VR observables data match the one or more trainee input actions performed within the virtual 3D training environment to orientation of at least one interactive 3D virtual object of the plurality of interactive 3D virtual objects.

5. The method of claim 1, wherein the VR observables data track the one or more trainee input actions performed within the virtual 3D training environment in six degrees of freedom to determine one or more positions and orientations within the virtual 3D training environment associated with each trainee input action.

6. The method of claim 1, wherein the state of each of the one or more interactive 3D virtual objects of the plurality of interactive 3D virtual objects includes the plurality of metrics for the determining whether the plurality of skills have been demonstrated.

7. The method of claim 6, wherein the state of each respective interactive 3D virtual object of the one or more interactive 3D virtual objects comprises at least one of the state of the respective interactive 3D virtual object at a point in time or a change of state of the respective interactive 3D virtual object at a point in time or during a period of time.

8. The method of claim 1, wherein the VR observables data match the one or more trainee input actions performed within the virtual 3D training environment to a trajectory prediction model that outputs, for each trainee input action one or more of a heading, an angle, a course, and a derived velocity.

9. The method of claim 1, wherein the one or more skill nodes graphically indicate that the plurality of skills have not yet been demonstrated by the trainee, wherein the step of updating the graphical dashboard comprises updating the plurality of skill nodes to graphically indicate that the plurality of skills have been demonstrated by the trainee during the training exercise.

10. The method of claim 1, wherein the training exercise comprises a team exercise for a first team and a second team, wherein the trainee is a member of the first team, wherein the one or more skill nodes represent the one or more skills to be demonstrated by the first team during the training exercise.

11. The method of claim 1, wherein the near-to-eye display device is a head mounted VR display, and the virtual 3D training environment is an immersive virtual environment.

12. The method of claim 1, further comprising at least one tracked input device communicatively coupled with the at least one host computing system, wherein the at least one tracked input device is configured to transmit trainee inputs to the at least one host computing system to generate the one or more trainee input actions within the virtual 3D training environment.

13. A system comprising:

a processor;

non-transitory machine-readable memory that stores one or more skill nodes, one or more representative training environments, and a plurality of interactive 3D virtual objects;

one or more host computing systems communicatively coupled to the processor; and a near-to-eye display device communicatively coupled to at least one host computing system of the one or more host computing systems, wherein the processor in communication with the non-transitory machine-readable memory and the at least one host computing system executes a set of instructions instructing the processor to:

output, for display, a graphical dashboard associated with a training exercise, wherein the graphical dashboard further includes a directed graph comprising:

a plurality of metrics to be collected during execution of the training exercise;

a plurality of skill nodes that represent a plurality of skills to be demonstrated by a trainee during the training exercise;

a plurality of learning objectives;

indications of a first set of hierarchical relationships between the plurality of metrics and the plurality of skill nodes and a second set of hierarchical relationships between the plurality of skill nodes and the plurality of learning objectives; and a mapping of a plurality of software agents to the plurality of metrics;

select the plurality of software agents that are associated with the plurality of skill nodes, wherein the plurality of software agents are configured to collect virtual reality (VR) observables data for calculating the plurality of metrics corresponding to the plurality of skill nodes from the at least one host computing system while the trainee performs one or more trainee input actions within a virtual three-dimensional (3D) training environment displayed by the near-to-eye display device, wherein the VR observables data match the one or more trainee input actions performed within the virtual 3D training environment to a state of each of one or more interactive 3D virtual objects of the plurality of interactive 3D virtual objects;

transmit to the at least one host computing system for execution during the training exercise, an indication of the plurality of software agents that are executed during the training exercise;

transmit to the at least one host computing system one or more metric parameters to configure the plurality of software agents to calculate the plurality of metrics for determining whether the plurality of skills have been demonstrated;

receive from the at least one host computing system the VR observables data collected by the plurality of software agents during execution and the plurality of metrics calculated from the VR observables data;

automatically monitor the trainee input actions performed within the virtual 3D training environment using the VR observables data received from the plurality of software agents and the plurality of metrics calculated by the plurality of software agents from the VR observables data to determine whether the plurality of skills represented by the plurality of skill nodes have been demonstrated by the trainee during the training exercise; and responsive to determining that the plurality of skills have been demonstrated, update the graphical dashboard to indicate that the plurality of skills have been demonstrated by the trainee during the training exercise; and responsive to determining that the one or more of the plurality of skills indicate that the trainee met a learning objective of the plurality of learning objectives, update the graphical dashboard to indicate that the learning objective of the plurality of learning objectives has been met.

14. The system of claim 13, wherein the VR observables data match the one or more trainee input actions performed within the virtual 3D training environment to one or both magnification and level of detail of at least one interactive 3D virtual object of the plurality of interactive 3D virtual objects.

15. The system of claim 13, wherein the VR observables data match the one or more trainee input actions performed within the virtual 3D training environment to orientation of at least one interactive 3D virtual object of the plurality of interactive 3D virtual objects.

16. The system of claim 13, wherein the near-to-eye display device is a head mounted VR display, and the virtual 3D training environment is an immersive virtual environment.

17. The system of claim 13, further comprising at least one tracked input device communicatively coupled with the at least one host computing system, wherein the at least one tracked input device is configured to transmit trainee inputs to the at least one host computing system to generate the one or more trainee input actions within the virtual 3D training environment.

18. The system of claim 13, wherein at least one tracked input device comprises one or more of a hand-held keypad, a first device for tracking movements of the trainee's arms and hands, a cyberglove, a second device for tracking movements of the trainee's retina or pupil, a touch gesture sensor, a tactile input device with reaction force generator, and a camera.

19. The method of claim 1, wherein a further learning objective of the plurality of learning objectives is supported by a first skill and a second skill of the plurality of skills, the method further comprising:

responsive to determining that the first skill has been demonstrated and the second skill has not been demonstrated, updating, by the server and for display, the graphical dashboard to indicate that the further learning objective of the plurality of learning objectives has not been met.

20. The method of claim 1, wherein the plurality of software agents include one or more hypervisor agents to deploy onto virtual machine platforms hosting at least one virtual machine of the at least one host computing system.

* * * * *